US012699159B2

(12) United States Patent
Wang et al.

(10) Patent No.: US 12,699,159 B2
(45) Date of Patent: Aug. 4, 2026

(54) METHOD FOR DIRECTING USER AND ELECTRONIC DEVICE

(71) Applicant: HUAWEI TECHNOLOGIES CO., LTD., Shenzhen (CN)

(72) Inventors: Qi Wang, Shenzhen (CN); Lan Peng, Shenzhen (CN); Zhenguo Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 18/623,947

(22) Filed: Apr. 1, 2024

(65) Prior Publication Data

US 2024/0248163 A1      Jul. 25, 2024

Related U.S. Application Data

(63) Continuation of application No. PCT/CN2022/119148, filed on Sep. 15, 2022.

(30) Foreign Application Priority Data

Sep. 30, 2021    (CN) .......................... 202111162119.5
May 12, 2022    (CN) .......................... 202210516542.9

(51) Int. Cl.
*G01S 3/805*      (2006.01)
(52) U.S. Cl.
CPC .................................... *G01S 3/805* (2013.01)
(58) Field of Classification Search
CPC ........ G01S 3/805; G01S 3/801; G01S 3/8083; H04W 64/006; H04W 4/02
See application file for complete search history.

(56) References Cited

U.S. PATENT DOCUMENTS

| | | | | | |
|---|---|---|---|---|---|
| 5,732,043 | A | * | 3/1998 | Nguyen .................. | G01S 11/14 |
| | | | | | 367/127 |
| 9,575,155 | B2 | * | 2/2017 | Price .......................... | G01S 3/80 |
| 10,935,630 | B2 | * | 3/2021 | Swanson .................. | G01S 5/20 |
| 2024/0248163 | A1 | * | 7/2024 | Wang .................. | H04W 64/006 |

FOREIGN PATENT DOCUMENTS

| | | | | | | |
|---|---|---|---|---|---|---|
| CN | 107810426 | A | | 3/2018 | | |
| CN | 112098937 | A | * | 12/2020 | .............. | G01S 5/24 |
| CN | 112098945 | A | | 12/2020 | | |
| CN | 112104929 | A | * | 12/2020 | .............. | H04R 1/20 |
| CN | 115914988 | A | * | 4/2023 | ............ | G01S 3/801 |
| CN | 112098937 | B | * | 5/2024 | .............. | G01S 5/20 |
| CN | 119316793 | A | * | 1/2025 | ............ | H04W 64/00 |
| EP | 4391595 | A1 | * | 6/2024 | ............ | G01S 3/801 |
| EP | 4468746 | A1 | * | 11/2024 | ............ | H04R 25/00 |
| WO | WO-2023051274 | A1 | * | 4/2023 | ............ | G01S 3/801 |

OTHER PUBLICATIONS

Translation of CN112098937 (Year: 2024).*

* cited by examiner

*Primary Examiner* — Daniel Pihulic

(57) ABSTRACT

This application provides a method for directing a user and an electronic device. A first electronic device exchanges an ultrasonic signal with a second electronic device, and the first electronic device outputs a directing signal according to the ultrasonic signal and angle information between the two devices, to guide user to search for the second electronic device. The first electronic device and the second electronic device do not need to be installed with a UWB chip, thereby reducing costs.

15 Claims, 14 Drawing Sheets

Electronic device 100

800

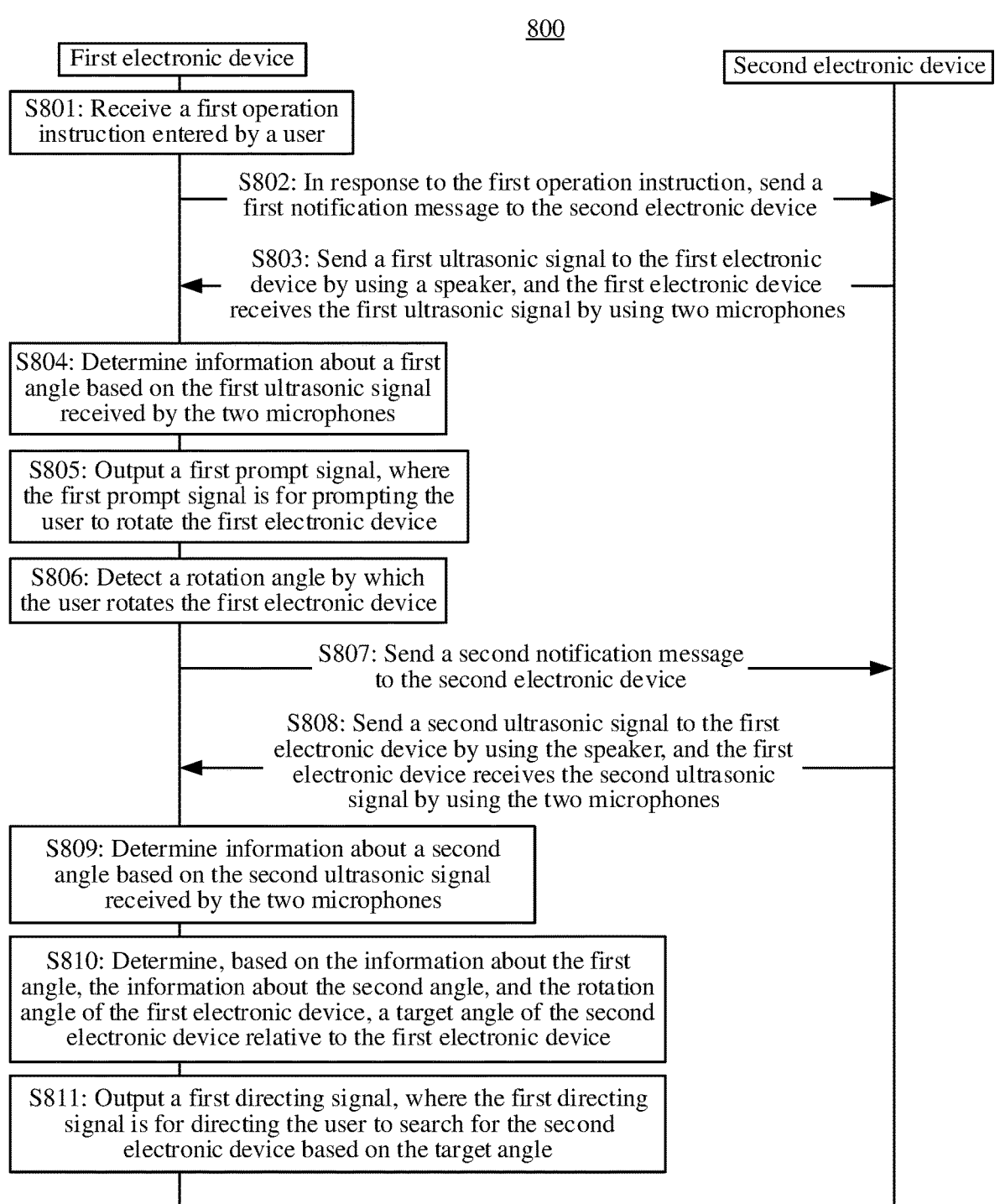

First electronic device

Second electronic device

S801: Receive a first operation instruction entered by a user

S802: In response to the first operation instruction, send a first notification message to the second electronic device S803: Send a first ultrasonic signal to the first electronic device by using a speaker, and the first electronic device receives the first ultrasonic signal by using two microphones S804: Determine information about a first angle based on the first ultrasonic signal received by the two microphones S805: Output a first prompt signal, where the first prompt signal is for prompting the user to rotate the first electronic device S806: Detect a rotation angle by which the user rotates the first electronic device S807: Send a second notification message to the second electronic device S808: Send a second ultrasonic signal to the first electronic device by using the speaker, and the first electronic device receives the second ultrasonic signal by using the two microphones S809: Determine information about a second angle based on the second ultrasonic signal received by the two microphones S810: Determine, based on the information about the first angle, the information about the second angle, and the rotation angle of the first electronic device, a target angle of the second electronic device relative to the first electronic device S811: Output a first directing signal, where the first directing signal is for directing the user to search for the second electronic device based on the target angle

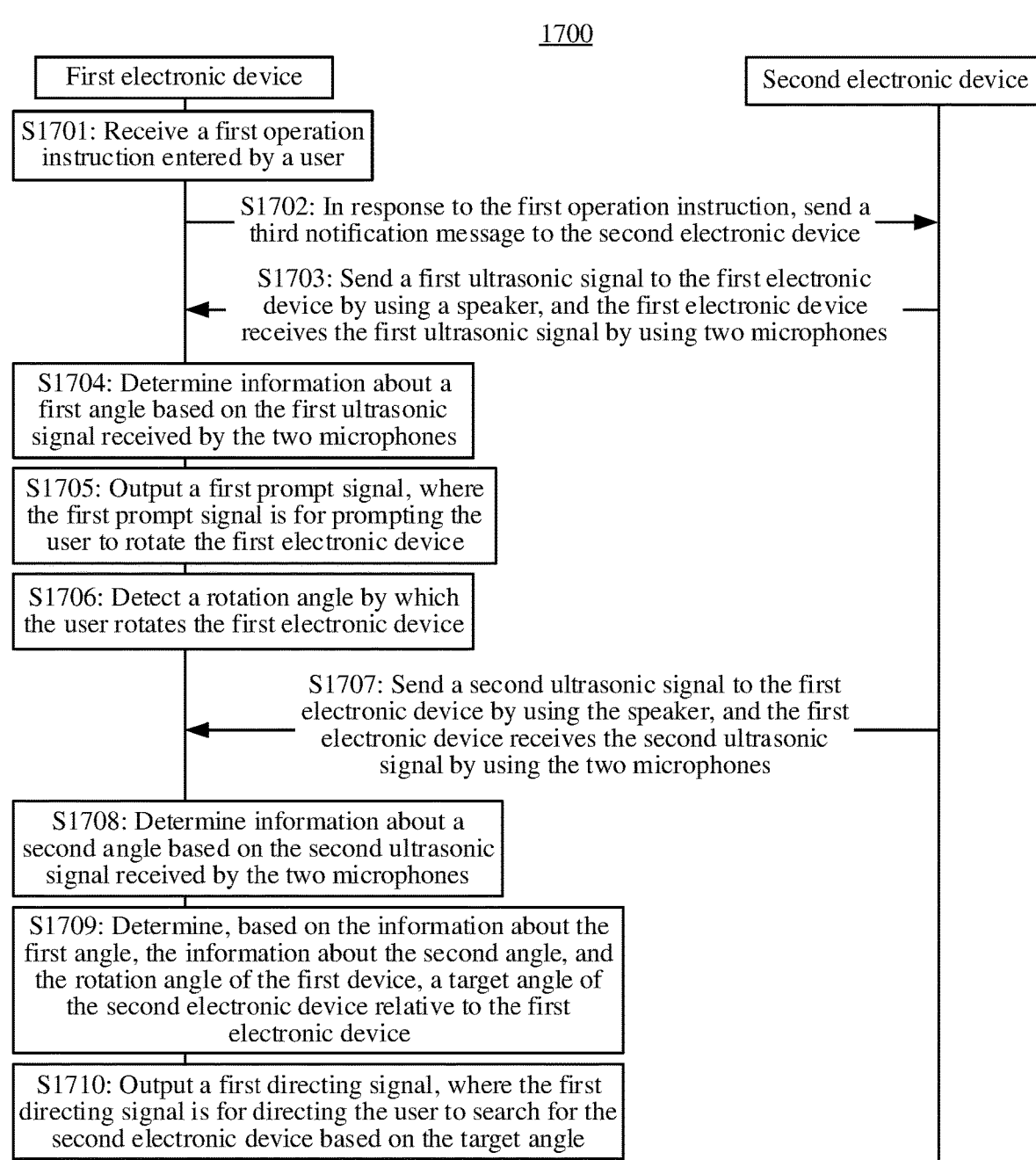

First electronic device

Second electronic device

S1701: Receive a first operation instruction entered by a user

S1702: In response to the first operation instruction, send a third notification message to the second electronic device S1703: Send a first ultrasonic signal to the first electronic device by using a speaker, and the first electronic device receives the first ultrasonic signal by using two microphones S1704: Determine information about a first angle based on the first ultrasonic signal received by the two microphones S1705: Output a first prompt signal, where the first prompt signal is for prompting the user to rotate the first electronic device S1706: Detect a rotation angle by which the user rotates the first electronic device S1707: Send a second ultrasonic signal to the first electronic device by using the speaker, and the first electronic device receives the second ultrasonic signal by using the two microphones S1708: Determine information about a second angle based on the second ultrasonic signal received by the two microphones S1709: Determine, based on the information about the first angle, the information about the second angle, and the rotation angle of the first device, a target angle of the second electronic device relative to the first electronic device S1710: Output a first directing signal, where the first directing signal is for directing the user to search for the second electronic device based on the target angle

FIG. 17

METHOD FOR DIRECTING USER AND ELECTRONIC DEVICE

CROSS-REFERENCE TO RELATED APPLICATION

This application is a continuation of International Application No. PCT/CN 2022/119148, filed on Sep. 15, 2022, which claims priority to Chinese Patent Application No. 202210516542.9, filed on May 12, 2022 and Chinese Patent Application No. 202111162119.5, filed on Sep. 30, 2021. All of the aforementioned patent applications are hereby incorporated by reference in their entireties.

TECHNICAL FELD

This application relates to the field of electronic technologies, and more specifically, to a method for directing a user and an electronic device in the field of electronic technologies.

BACKGROUND

In daily life, if an electronic device is lost and a user fails to find the electronic device, the user may search for the lost electronic device by using another electronic device of the user. For example, in some solutions, the another electronic device of the user may locate the lost electronic device by using an ultra-wideband (UWB) technology to find the lost electronic device. However, this requires that both the lost electronic device and the another electronic device of the user have a UWB chip. Therefore, costs are high. In particular, some electronic devices may have small sizes, and a UWB chip cannot be installed due to the size. In this case, the lost electronic device cannot be found.

SUMMARY

Embodiments of this application provide a method for directing a user and an electronic device, to reduce costs.

According to a first aspect, a method for directing a user is provided. The method is applicable to a first electronic device and includes: determining, based on a first ultrasonic signal sent by a second electronic device, information about a first angle of the second electronic device relative to the first electronic device; outputting a first prompt signal, where the first prompt signal is for prompting the user to rotate the first electronic device; determining, based on a second ultrasonic signal sent by the second electronic device, information about a second angle of the second electronic device relative to the first electronic device; and outputting a first directing signal based on the information about the first angle, the information about the second angle, and a rotation angle of the first electronic device, where the first directing signal is for directing the user to search for the second electronic device.

In the foregoing solution, the second electronic device may send the first ultrasonic signal. The first electronic device may determine, based on the first ultrasonic signal, the information about the first angle that is between the first electronic device and the second electronic device. The first electronic device outputs the first prompt signal to prompt the user to rotate the first electronic device. After the user rotates the first electronic device, the second electronic device may send the second ultrasonic signal, and the first electronic device may determine, based on the second ultrasonic signal, the information about the second angle that is between the first electronic device and the second electronic device. The first electronic device may output the first directing signal by using the information about the first angle, the information about the second angle, and the rotation angle of the first electronic device, to direct the user to search for the second electronic device. The user may search for the second electronic device based on the first directing signal. The first electronic device and the second electronic device do not need to be installed with a UWB chip, so that costs can be reduced. In addition, in a process in which the user rotates the first electronic device, a straight line in which two microphones of the first electronic device are located is also rotated accordingly. Therefore, a coordinate system of the first electronic device also changes accordingly. An angle of the second electronic device relative to the first electronic device may be determined by using the information that is about the first angle and that is obtained before rotation, the information that is about the second angle and that is obtained after rotation, and the rotation angle of the first electronic device, so that a problem that the angle of the second electronic device relative to the first electronic device cannot be determined through one time of measurement is avoided.

Optionally, after the first electronic device outputs the first prompt signal, the first electronic device may detect the rotation angle of the first electronic device. Optionally, after a preset time after the first electronic device outputs the first prompt signal, the first electronic device may detect the rotation angle of the first electronic device. Optionally, a gyroscope of the first electronic device may detect the rotation angle of the first electronic device.

Optionally, the first prompt signal is displayed on a display of the first electronic device.

Optionally, the first electronic device may alternatively output a first prompt signal of a voice type, so that the user can also obtain the first prompt signal when not viewing the display of the first electronic device.

Optionally, the information about the first angle indicates a possible angle of the second electronic device relative to the first electronic device. For example, the information about the first angle indicates the first angle and the second angle, where the second angle is an angle opposite to the first angle, and the first angle and the second angle are possible angles of the second electronic device relative to the first electronic device.

Optionally, the information about the second angle indicates a possible angle of the second electronic device relative to the first electronic device. For example, the information about the second angle indicates a fifth angle and a sixth angle, where the sixth angle is an angle opposite to the fifth angle, and the fifth angle and the sixth angle are possible angles of the second electronic device relative to the first electronic device.

Optionally, the first electronic device includes two microphones, and the first electronic device may respectively receive the first ultrasonic signal and the second ultrasonic signal by using the two microphones. Optionally, a distance between the two microphones included in the first electronic device is greater than or equal to a preset distance.

Optionally, the first directing signal may indicate an approximate orientation of the second electronic device. For example, the first directing signal directs that the second electronic device is in front of the first electronic device on a right side. In other words, the first directing signal may direct a specific location of the second electronic device, or may direct an approximate location of the second electronic device.

In some implementations, the outputting a first directing signal based on the information about the first angle, the information about the second angle, and a rotation angle of the first electronic device includes:

determining, based on the information about the first angle, the information about the second angle, and the rotation angle of the first electronic device, a target angle of the second electronic device relative to the first electronic device; and outputting the first directing signal based on the target angle, where the first directing signal is for directing the user to search for the second electronic device based on the target angle.

In the foregoing solution, the first electronic device may determine, based on the information about the first angle, the information about the second angle, and the rotation angle of the first electronic device, the target angle of the second electronic device relative to the first electronic device. The first directing signal may direct the user to search for the second electronic device based on the target angle. In this way, the second electronic device may be accurately located.

In some implementations, the determining, based on the information about the first angle, the information about the second angle, and the rotation angle of the first electronic device, a target angle of the second electronic device relative to the first electronic device includes:

determining information about a third angle based on the rotation angle of the first electronic device and the information about the first angle; and determining the target angle based on the information about the second angle and the information about the third angle.

In some implementations, the information about the first angle indicates the first angle and the second angle, and the second angle is the angle opposite to the first angle.

The determining information about a third angle based on the rotation angle of the first electronic device and the information about the first angle includes:

subtracting the rotation angle of the first electronic device from the first angle indicated by the information about the first angle, to obtain the third angle; and subtracting the rotation angle of the first electronic device from the second angle indicated by the information about the first angle, to obtain a fourth angle, where the information about the third angle indicates the third angle and the fourth angle.

In the foregoing solution, because the user rotates the first electronic device, it is equivalent to a case that the coordinate system that is of the first electronic device and that is obtained when the first electronic device determines the information about the first angle is also rotated. For example, if the first electronic device detects that the rotation angle of the first electronic device is $\alpha$ degrees, it is equivalent to a case that the coordinate system that is of the first electronic device and that is obtained when the first electronic device determines the information about the first angle is also rotated by $\alpha$ degrees. Therefore, it is equivalent to a case that after the coordinate system is rotated, an angle indicated by the information about the first angle also needs to be correspondingly transformed, and the target angle is determined by using the transformed angle, so that accuracy of determining the target angle can be improved.

In some implementations, the information about the second angle indicates the fifth angle and the sixth angle, and the sixth angle is the angle opposite to the fifth angle. The determining the target angle based on the information about the second angle and the information about the third angle includes: determining two closest angles in the third angle, the fourth angle, the fifth angle, and the sixth angle; and determining the target angle based on the two closest angles.

In the foregoing solution, because the second electronic device basically does not move, in the four angles determined by the first electronic device through two times of measurement, if two angles are close, it indicates that the two angles are angles of the second electronic device relative to the first electronic device. In other words, if an angle of the second electronic device relative to the first electronic device cannot be determined through one time of measurement, because a location of the second electronic device before and after rotation of the first electronic device is basically unchanged, results of the two times of measurement before and after the rotation may be compared to determine the target angle of the second electronic device relative to the first electronic device. Therefore, the second electronic device may be located.

Optionally, that the first electronic device determines the target angle based on the two closest angles includes: the first electronic device determines either of the two closest angles as the target angle. Optionally, that the first electronic device determines the target angle based on the two closest angles includes: the first electronic device determines an average value of the two closest angles as the target angle.

In some implementations, the method further includes: sending a first notification message to the second electronic device in response to a first operation instruction, where the first notification message is for notifying the second electronic device to send an ultrasonic signal; and receiving the first ultrasonic signal from the second electronic device.

In the foregoing solution, the user may enter the first operation instruction. After receiving the first operation instruction, the first electronic device is triggered to send the first notification message to the second electronic device, and the second electronic device may send the first ultrasonic signal based on the first notification message. In this case, that the second electronic device cannot send the first ultrasonic signal is avoided.

Optionally, that the first electronic device sends a first notification message to the second electronic device includes: the first electronic device sends the first notification message to the second electronic device through a Bluetooth™ connection. Optionally, before the first electronic device sends the first notification message to the second electronic device, the first electronic device establishes the Bluetooth™ connection to the second electronic device.

Optionally, the sending a first notification message to the second electronic device includes: the first electronic device sends the first notification message to the second electronic device through a Wi-Fi™ connection. Optionally, before the first electronic device sends the first notification message to the second electronic device, the first electronic device establishes the Wi-Fi™ connection to the second electronic device.

In some implementations, after the outputting a first prompt signal, the method further includes:

sending a second notification message to the second electronic device, where the second notification message is for notifying the second electronic device to send an ultrasonic signal; and receiving the second ultrasonic signal from the second electronic device.

In the foregoing solution, the second electronic device may send the second ultrasonic signal based on the second notification message. In this case, that the second electronic device cannot send the second ultrasonic signal is avoided.

Optionally, that the first electronic device sends a second notification message to the second electronic device includes: the first electronic device sends the second notification message to the second electronic device through the Bluetooth™ connection. Optionally, before the first electronic device sends the second notification message to the second electronic device, the first electronic device establishes the Bluetooth™ connection to the second electronic device.

Optionally, that the first electronic device sends a second notification message to the second electronic device includes: the first electronic device sends the second notification message to the second electronic device through the Wi-Fi™ connection. Optionally, before the first electronic device sends the second notification message to the second electronic device, the first electronic device establishes the Wi-Fi™ connection to the second electronic device.

Optionally, after the first electronic device detects the rotation angle by which the user rotates the first electronic device, the first electronic device is triggered to send the second notification message to the second electronic device.

In some implementations, the method further includes: sending a third notification message to the second electronic device in response to a first operation instruction, where the third notification message is for notifying the second electronic device to periodically send an ultrasonic signal, and the ultrasonic signal periodically sent by the second electronic device includes the first ultrasonic signal and the second ultrasonic signal.

In the foregoing solution, the second electronic device may periodically send the ultrasonic signal based on the third notification message. In this case, that the second electronic device cannot send the ultrasonic signal is avoided.

Optionally, that the first electronic device sends a third notification message to the second electronic device includes: the first electronic device sends the third notification message to the second electronic device through a Bluetooth™ connection. Optionally, before the first electronic device sends the third notification message to the second electronic device, the first electronic device establishes the Bluetooth™ connection to the second electronic device.

Optionally, that the first electronic device sends a third notification message to the second electronic device includes: the first electronic device sends the third notification message to the second electronic device through a Wi-Fi™ connection. Optionally, before the first electronic device sends the third notification message to the second electronic device, the first electronic device establishes the Wi-Fi™ connection to the second electronic device.

In some implementations, the method further includes: determining signal strength of a received third ultrasonic signal; and outputting a second directing signal, where the second directing signal indicates the signal strength.

In the foregoing solution, in a process in which the user searches for the second electronic device, the user may be moving while holding the first electronic device. In a process of the movement, the second electronic device continues to send the third ultrasonic signal, and the first electronic device may determine, based on the signal strength of the third ultrasonic signal sent by the second electronic device, whether the user is approaching the second electronic device or is moving away from the second electronic device. If the signal strength of the third ultrasonic signal sent by the second electronic device is high, it indicates that the first electronic device is approaching the second electronic device. If the signal strength of the third ultrasonic signal sent by the second electronic device is low, it indicates that the first electronic device is moving away from the second electronic device.

Optionally, the third ultrasonic signal may be the first ultrasonic signal, may be the second ultrasonic signal, or may be an ultrasonic signal different from the first ultrasonic signal and the second ultrasonic signal.

In some implementations, the first electronic device includes a first microphone and a second microphone, and a distance between the first microphone and the second microphone is greater than a preset distance.

In some implementations, the determining, based on a first ultrasonic signal sent by a second electronic device, information about a first angle of the second electronic device relative to the first electronic device includes:

determining, based on the first ultrasonic signal, a first distance difference between a distance between a speaker of the second electronic device that sends the first ultrasonic signal and the first microphone and a distance between the speaker and the second microphone; and determining, based on the first distance difference and the distance between the first microphone and the second microphone, the information about the first angle of the second electronic device relative to the first electronic device.

In the foregoing solution, the first electronic device may determine, by using the first distance difference between the distance between the speaker of the second electronic device that sends the first ultrasonic signal and the first microphone and the distance between the speaker and the second microphone, and the distance between the first microphone and the second microphone, the information about the first angle of the second electronic device relative to the first electronic device. Therefore, the information about the first angle may be determined by using the first ultrasonic signal.

In some implementations, the determining, based on a second ultrasonic signal sent by the second electronic device, information about a second angle of the second electronic device relative to the first electronic device includes:

determining, based on the second ultrasonic signal, a second distance difference between a distance between the speaker of the second electronic device that sends the second ultrasonic signal and the first microphone and a distance between the speaker and the second microphone; and determining the information about the second angle based on the second distance difference and the distance between the first microphone and the second microphone.

In the foregoing solution, the first electronic device may determine, by using the second distance difference between the distance between the speaker of the second electronic device that sends the second ultrasonic signal and the first microphone and the distance between the speaker and the second microphone, and the distance between the first microphone and the second microphone, the information about the second angle of the second electronic device relative to the first electronic device. Therefore, the information about the second angle may be determined by using the second ultrasonic signal.

Optionally, if the speaker sending the first ultrasonic signal and the speaker sending the second ultrasonic signal are a same speaker, the first distance difference is equal to the second distance difference.

In some implementations, the first electronic device is a mobile phone, and the second electronic device is a TAG device.

In the foregoing solution, the user places the TAG device in an article in advance, and the user may search for the TAG device by using the mobile phone, to find the article, thereby avoiding blind searching for the article by the user.

In some embodiments, in a process in which the user moves the first electronic device, the first electronic device may rotate. The first electronic device may detect a rotation angle of the first electronic device, and determine, based on the rotation angle of the first electronic device and the target angle, an angle for directing the user. In other words, the first electronic device may detect in real time whether the first electronic device deviates from the target angle. If the first electronic device deviates from the target angle, the first electronic device may direct the user to search for the second electronic device based on a deviation angle and the target angle.

According to a second aspect, this application provides an apparatus. The apparatus is included in an electronic device, and the apparatus has a function of implementing behavior of the first electronic device in the first aspect and the implementations of the first aspect. The function may be implemented by using hardware, or may be implemented by using hardware executing corresponding software. The hardware or the software includes one or more modules or units corresponding to the foregoing functions, for example, a determining module or unit or a transmission module or unit.

Optionally, the apparatus may be the foregoing first electronic device.

According to a third aspect, this application provides an apparatus. The apparatus includes a processor, where the processor is coupled to a memory. The memory is configured to store a computer program or instructions. The processor is configured to execute the computer program or the instructions stored in the memory, so that the method in the first aspect and the implementations of the first aspect is performed.

For example, the processor is configured to execute the computer program or the instructions stored in the memory, to enable the apparatus to perform the method in the first aspect and the implementations of the first aspect.

Optionally, the apparatus includes one or more processors.

Optionally, the apparatus may further include the memory coupled to the processor.

Optionally, the apparatus may include one or more memories.

Optionally, the memory may be integrated with the processor, or separately disposed.

Optionally, the apparatus may further include a transceiver.

Optionally, the apparatus may be the foregoing first electronic device.

According to a fourth aspect, this application provides an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the method that is for directing a user and that is in any one of the first aspect or the implementations of the first aspect, or the method that is for directing a user and that is described in any embodiment of this application.

Optionally, the electronic device may further include a touch display and/or a camera. The touch display includes a touch-sensitive surface and a display.

According to a fifth aspect, this application provides a computer-readable storage medium, including computer instructions. When the computer instructions are run on an electronic device, the electronic device is enabled to perform the method that is for directing a user and that is in any one of the first aspect or the implementations of the first aspect, or the method that is for directing a user and that is described in any embodiment of this application.

According to a sixth aspect, this application provides a computer program product. When the computer program product runs on an electronic device, the electronic device is enabled to perform the method that is for directing a user and that is in any one of the first aspect or the implementations of the first aspect, or the method that is for directing a user and that is described in any embodiment of this application.

According to a seventh aspect, this application provides an apparatus, including a unit configured to perform the method described in any embodiment of this application.

BRIEF DESCRIPTION OF DRAWINGS

FIG. 8 is a diagram of a method for directing a user according to an embodiment of this application;

FIG. 17 is a diagram of another method for directing a user according to an embodiment of this application.

DESCRIPTION OF EMBODIMENTS

The following describes technical solutions in embodiments of this application with reference to the accompanying drawings in embodiments of this application.

The following clearly and completely describes the technical solutions in embodiments of this application with reference to the accompanying drawings. In descriptions of embodiments of this application, "/" means "or" unless otherwise specified. For example, A/B may indicate A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of embodiments of this application, unless otherwise specified, "a plurality of" means two or more.

Figure 1:
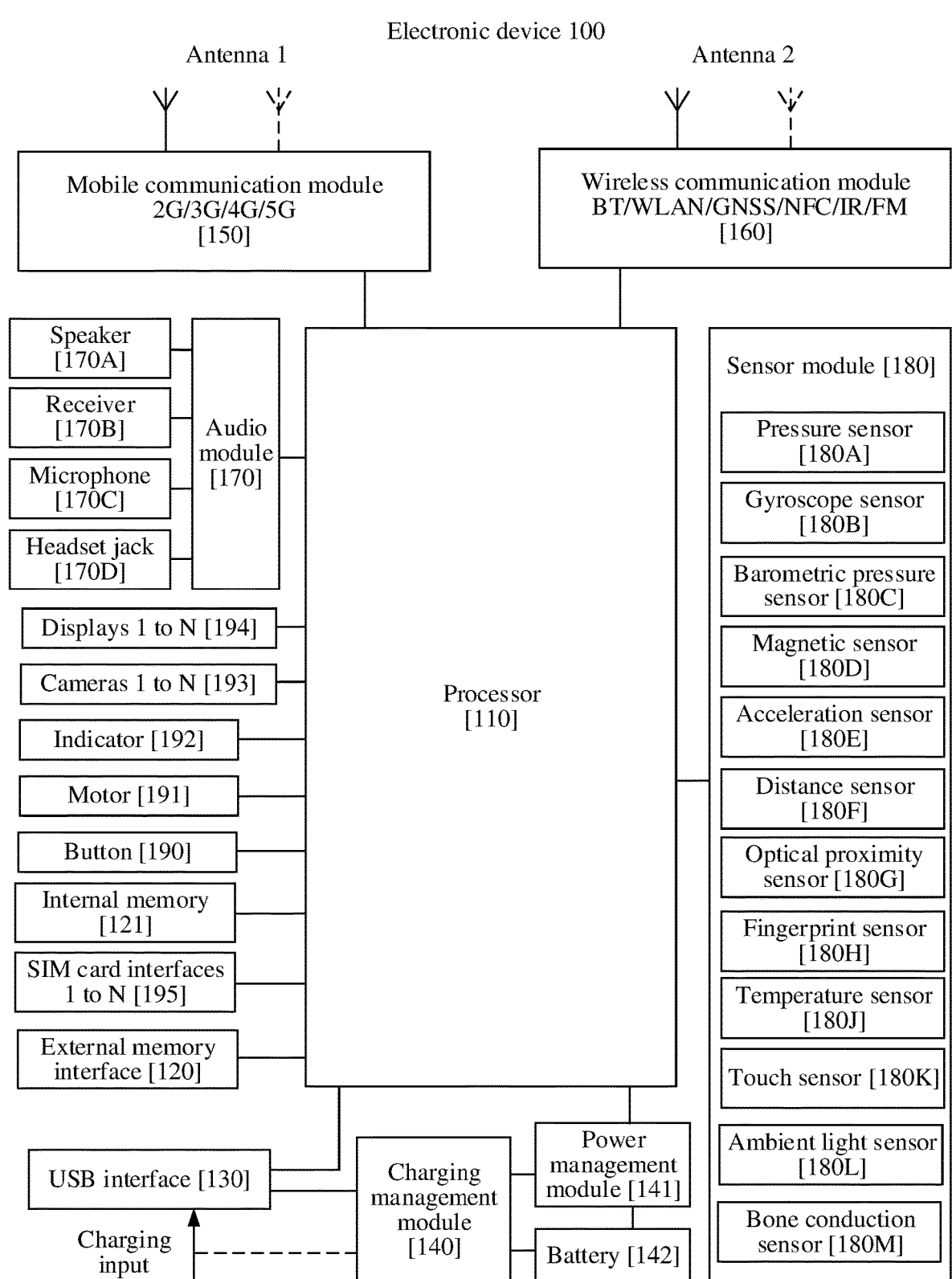
FIG. 1 is a diagram of a structure of an electronic device according to an embodiment of this application.

FIG. 1 is a diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset Jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth™ headset.

The PCM interface may also be used for audio communication, and analog signal sampling, quantization, and coding. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call by using a Bluetooth™ headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth™ module in the wireless communication module 160 through the UART interface, to implement a Bluetooth™ function. In some embodiments, the audio module 170 may transmit an audio signal to the wireless communication module 160 through the UART interface, to implement a function of playing music by using a Bluetooth™ headset.

The MIPI interface may be used to connect the processor 110 to a peripheral device such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be used to connect the processor 110 to the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be a mini USB interface, a micro USB interface, a USB Type-C interface, or the like. The USB interface 130 may be used to connect to the charger to charge the electronic device 100, may be used to transmit data between the electronic device 100 and a peripheral device, or may be used to connect to a headset, to play audio by using the headset. The interface may be further used to connect to another electronic device, for example, an augmented reality (AR) device.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device 100 by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi™) network), Bluetooth™ (BT), a global navigation satellite system (GNSS), frequency modulation (FM), near field communication (NFC), an infrared (IR) technology, or the like. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), a 5th generation wireless communication system (5G), the BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning. Applications such as intelligent cognition of the electronic device 100, for example, image recognition, facial recognition, voice recognition, and text understanding, may be implemented through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a non-volatile memory, for example, at least one magnetic disk storage device, a flash memory device, or a universal flash storage (UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A. In some embodiments, the speaker 170A is configured to send an ultrasonic signal.

The receiver 170B, also referred to as an "earpiece", is configured to convert an audio electrical signal into a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may place a mouth of the user near the microphone 170C to make a sound, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and further identify a sound source, to implement a directional recording function and the like. In some embodiments, the two microphones 170C disposed in the electronic device 100 may receive an ultrasonic signal sent by a speaker of another electronic device. Optionally, a distance between the two microphones 170C of the electronic device 100 is greater than a preset distance. For example, the preset distance is 2 cm, 4 cm, 6 cm, 8 cm, or 10 cm.

The headset jack 170D is used to connect to a wired headset. The headset jack 170D may be the USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A.

The gyroscope sensor 180B may be configured to determine a motion posture of the electronic device 100. In some embodiments, a rotation angle of the electronic device 100 may be detected by using the gyroscope sensor 180B. In some embodiments, an angular velocity of the electronic device 100 around three axes (that is, axes x, y, and z) may be determined by using the gyroscope sensor 180B. The gyroscope sensor 180B may be configured to implement image stabilization during photographing. For example, when a shutter is pressed, the gyroscope sensor 180B detects an angle by which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in locating and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking of the flip cover is set based on a detected opening or closing state of a leather case or a detected opening or closing state of the flip cover.

The acceleration sensor 180E may detect values of acceleration in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed in the display 194, and the touch sensor 180K and the display 194 form a touchscreen. The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is also compatible with different types of SIM cards. The SIM card interface 195 is also compatible with the external storage card. The electronic device 100 interacts with the network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

It should be noted that any electronic device mentioned in embodiments of this application may include more or fewer modules than those shown in the electronic device 100.

A software system of the electronic device 100 may use a layered architecture, an event-driven architecture, a micro-kernel architecture, a micro service architecture, or a cloud architecture. In embodiments of this application, an Android™ system of a layered architecture is used as an example to describe a software structure of the electronic device 100.

Figure 2:
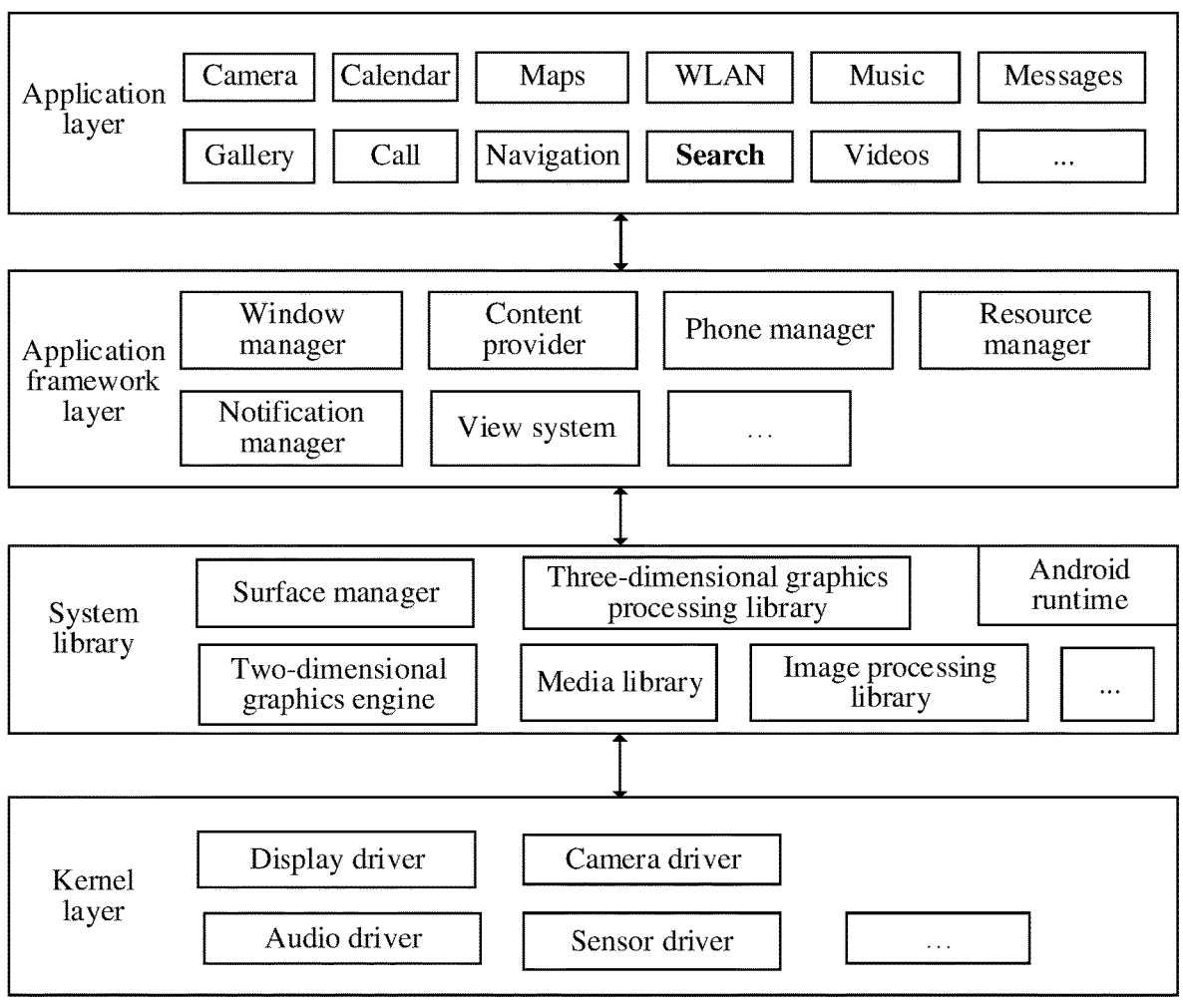
FIG. 2 is a diagram of a software architecture of an electronic device according to an embodiment of this application.

FIG. 2 is a diagram of a software structure of an electronic device 100 according to an embodiment of this application. In a layered architecture, software is divided into several layers, and each layer has a clear role and task. The layers communicate with each other through a software interface. In some embodiments, an Android™ system is divided into four layers: an application layer, an application framework layer, an Android™ runtime and system library, and a kernel layer from top to bottom. The application layer may include a series of application packages.

As shown in FIG. 2, the application package may include applications such as Camera, Gallery, Calendar, Call, Maps, Navigation, WLAN, Search, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources such as a localized character string, an icon, a picture, a layout file, and a video file for an application.

The notification manager enables an application to display notification message in a status bar, and may be configured to convey a notification type message. The displayed notification message may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background or a notification that appears on a screen in a form of a dialog window. For example, text information is displayed in the status bar, an announcement is given, the electronic device vibrates, or the indicator light blinks.

The Android™ runtime includes a kernel library and a virtual machine. The Android™ runtime is responsible for scheduling and management of the Android™ System.

The kernel library includes two parts: a performance function that needs to be invoked in java language and a kernel library of Android™.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In daily life, if an article of a user is lost, it is difficult to find the article. Therefore, a tag (TAG) device may be introduced. The TAG device may be placed in the article, and the user may use another electronic device to search for the TAG device, so that the article may be found, and the user can be prevented from blindly searching for the article.

The another electronic device may be a mobile phone, a tablet, a computer, or the like. In some embodiments, the another electronic device may locate the TAG device by using a UWB technology, to find the article. However, this requires that both the TAG device and the another electronic device have a UWB chip, causing high costs. In particular, some TAG devices have small sizes, and a UWB chip may not be installed due to the size. In this case, a function of locating the article cannot be implemented. The electronic device 100 in FIG. 1 and FIG. 2 may be a mobile phone, a tablet, or a computer. The electronic device 100 may alternatively be a TAG device.

In embodiments of this application, a second electronic device may be a TAG device, and a first electronic device may be a device, for example, a mobile phone, a tablet, or a computer, for locating the TAG device. The first electronic device and the second electronic device may be devices of a same type, or may be devices of different types. The electronic device 100 in FIG. 1 may be the first electronic device, or may be the second electronic device.

In embodiments of this application, the first electronic device may determine, by using an ultrasonic signal sent by the second electronic device, an angle of the second electronic device relative to the first electronic device. In this way, that a UWB chip needs to be installed on both the first electronic device and the second electronic device can be avoided, so that costs can be reduced.

Figure 3:
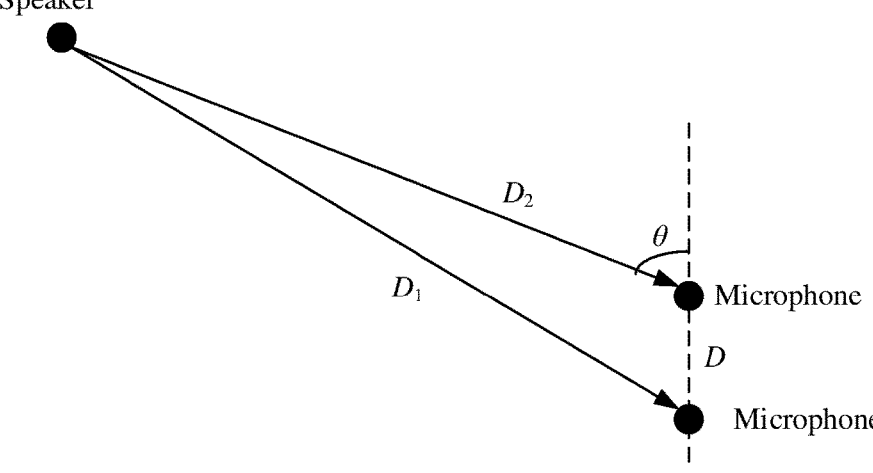
FIG. 3 to FIG. 5 are diagrams of principles in which a first electronic device determines, by using an ultrasonic signal sent by a second electronic device, an angle of the second electronic device relative to the first electronic device according to an embodiment of this application.

The following describes a principle in which the first electronic device determines, by using the ultrasonic signal sent by the second electronic device, the angle of the second electronic device relative to the first electronic device. As shown in FIG. 3, the second electronic device may send the ultrasonic signal by using a speaker of the second electronic device, two microphones of the first electronic device may receive the ultrasonic signal sent by the speaker of the second electronic device, and the first electronic device may measure, by using a time difference between signals received by the two microphones, the angle of the second electronic device relative to the first electronic device. For example, if a quantity of sampling points corresponding to the time difference between the signals received by the two microphones is $\tau*$, a distance between the two microphones of the first electronic device is D, and it is assumed that distances between the speaker of the second electronic device and the two microphones of the first electronic device are respectively $D_1$ and $D_2$, the quantity of sampling points corresponding to the time difference between the signals received by the two microphones is $$\tau* = \frac{D_1 - D_2}{V} f_s,$$

where $f_s$ is a sampling rate of the second electronic device, and v is a sound speed. The sound speed v may be a fixed value. For example, the sound speed at 15° C. is 340 m/s, and the fixed value may be stored in the first electronic device. Alternatively, the sound speed v may be determined based on a temperature of a current environment, for example, $v=331+0.607c$ m/s, where c is the temperature. The temperature c may be learned of by the first electronic device. For example, the temperature c is obtained through measurement by using a temperature sensor on the first electronic device. Alternatively, the temperature c may be learned of by the first electronic device from another device. For example, the second electronic device may send the temperature to the first electronic device after learning of the temperature. For example, the second electronic device may notify the first electronic device of the temperature after obtaining the temperature through measurement by using a temperature sensor of the second electronic device, or the second electronic device may notify the first electronic device of the temperature after learning of the temperature in another way. The first electronic device can learn of $\tau*$, $f_s$, and v, and therefore, $$D_1 - D_2 = \frac{v \cdot \tau*}{f_s}.$$

The first electronic device may determine the angle $\theta$ of the second electronic device relative to the first electronic device according to $$D_1 - D_2 = \frac{v \cdot \tau*}{f_s}.$$

Figure 4:
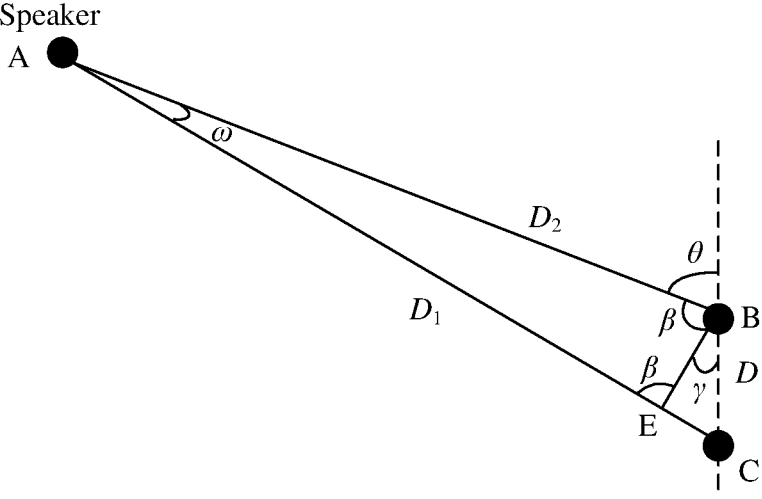

With reference to a principle in FIG. 4, the following provides descriptions of determining the angle $\theta$ of the second electronic device relative to the first electronic device according to $$D_1 - D_2 = \frac{v \cdot \tau*}{f_s}.$$

As shown in FIG. 4, $D_1 > D_2$, $AC = D_1$, $AB = D_2$, $EC = D_1 - D_2$, and $AE = D_2$, that is, a triangle ABE is an isosceles triangle, and therefore, $\angle AEB = \angle ABE = \beta$. When $D_1$ and $D_2$ are far greater than D, that is, $\omega \approx 0$, $\angle AEB = \angle ABE = \beta = 90°$ and $\theta + \gamma 90°$. It can be learned from a trilateral relationship of a triangle that $$\frac{D_1 - D_2}{\sin \gamma} = \frac{D}{\sin(180° - \beta)} \approx D,$$

and therefore, $\gamma = \arcsin$ $$\frac{D_1 - D_2}{D} \text{ and } \theta = 90° - \gamma = 90° - \arcsin \frac{D_1 - D_2}{D} = 90° - \arcsin \frac{v \cdot \tau*}{f_s \cdot D}.$$

In other words, if the speaker of the second electronic device and the two microphones of the first electronic device are in a same straight line, and the speaker of the second electronic device is above the two microphones of the first electronic device, $D_1 - D_2 = D$, and therefore $\theta = 0$.

Figure 5:
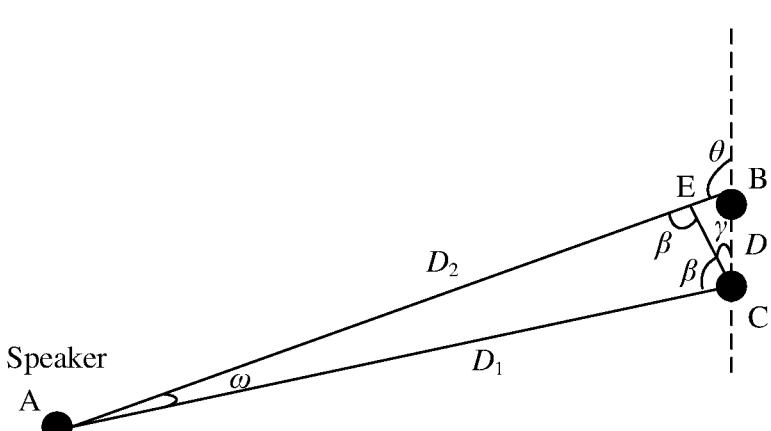

With reference to a principle in FIG. 5, the following provides descriptions of determining the angle $\theta$ of the second electronic device relative to the first electronic device according to $$D_1 - D_2 = \frac{v \cdot \tau*}{f_s}.$$

As shown in FIG. 5, when $D_1 < D_2$, $AC = D_1$, $AB = D_2$, $EB = D_2 - D_1$, and $AE = D_1$, that is, a triangle ACE is an isosceles triangle, and therefore, $\angle AEC = \angle ACE = \beta$. When $D_1$ and $D_2$ are far greater than D, that is, $\omega \approx 0$, $\angle AEC = \angle ACE = \beta = 90°$ and $\theta = 90° + \gamma$. It can be learned from a trilateral relationship of a triangle that $$\frac{D_2 - D_1}{\sin \gamma} = \frac{D}{\sin(180° - \beta)} \approx D,$$

and therefore, $$\gamma = \arcsin \frac{D_2 - D_1}{D}$$

and $$q = 90° + g =$$

$$90° + \arcsin \frac{D_2 - D_1}{D} = 90° - \arcsin \frac{D_1 - D_2}{D} = 90° - \arcsin \frac{n \times t*}{f_s \times D}.$$

In other words, if the speaker of the second electronic device and the two microphones of the first electronic device are in a same straight line, and the speaker of the second electronic device is below the two microphones of the first electronic device, $D_1 - D_2 = -D$ and therefore $\theta = 180°$.

It should be noted that the angle of the second electronic device relative to the first electronic device may be an angle formed by the speaker of the second electronic device and any one of the two microphones of the first electronic device. As shown in FIG. 4, the angle of the second electronic device relative to the first electronic device may be $\theta$. Optionally, the angle of the second electronic device relative to the first electronic device may alternatively be $\angle ACB$. A calculation manner of $\angle ACB$ is similar to that of $\theta$. To avoid repetition, details are not described. As shown in FIG. 5, the angle of the second electronic device relative to the first electronic device may be $\theta$. Optionally, the angle of the second electronic device relative to the first electronic device may alternatively be $\angle ACB$. A calculation manner of $\angle ACB$ is similar to that of $\theta$. To avoid repetition, details are not described.

It should be noted that the angle of the second electronic device relative to the first electronic device may be understood as an angle of the speaker of the second electronic device relative to a straight line in which the two microphones of the first electronic device are located, that is, $\theta$ shown in FIG. 3 to FIG. 5.

Figure 6:
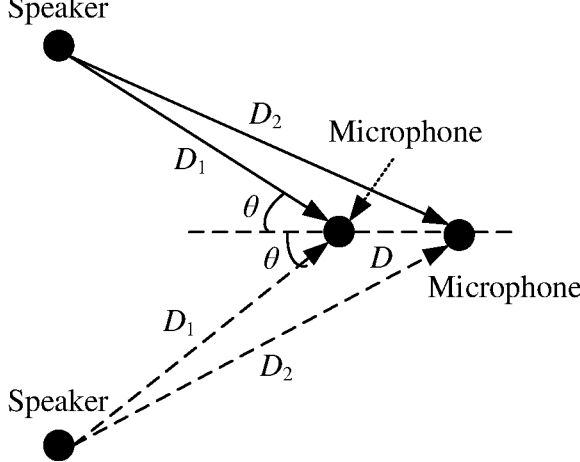
FIG. 6 is a diagram of a possible angle that is of a second electronic device relative to a first electronic device and that is calculated by the first electronic device according to an embodiment of this application.
Figure 7:
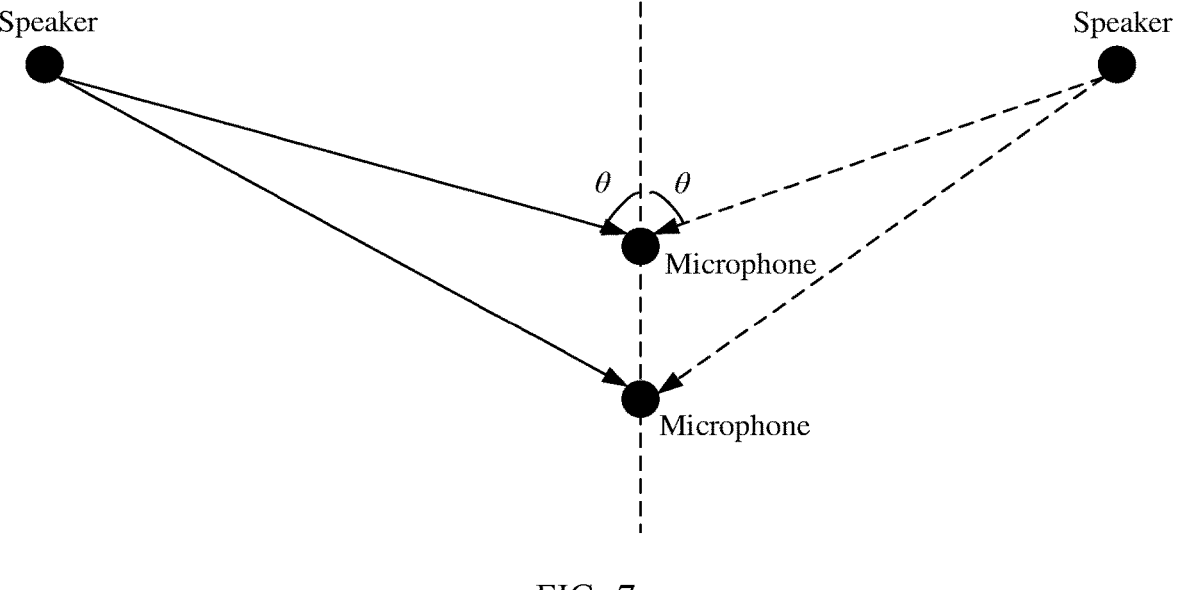
FIG. 7 is a diagram of a possible angle that is of a second electronic device relative to a first electronic device and that is calculated by the first electronic device according to an embodiment of this application.

When the angle of the second electronic device relative to the first electronic device is determined by using the principle shown in FIG. 4 or FIG. 5, and when the two microphones of the first electronic device are in a same straight line, that is, when locations of the two microphones of the first electronic device are symmetrical locations, as shown in FIG. 6, it is uncertain whether the angle that is of the second electronic device relative to the first electronic device and that is calculated by the first electronic device is above or below the straight line in which the two microphones are located. In other words, the angle of the second electronic device relative to the first electronic device is $\theta$, and the first electronic device cannot determine whether the speaker of the second electronic device is $\theta$ above or $\theta$ below the straight line in which the two microphones are located. Therefore, a unique angle of the second electronic device relative to the first electronic device cannot be determined. For another example, as shown in FIG. 7, it is uncertain whether the angle that is of the second electronic device relative to the first electronic device and that is calculated by the first electronic device is to the left or to the right of the straight line in which the two microphones are located. In other words, the angle of the second electronic device relative to the first electronic device is θ, and the first electronic device cannot determine whether the speaker of the second electronic device is θ degrees to the left or θ degrees to the right of the straight line in which the two microphones are located. Therefore, a unique angle of the second electronic device relative to the first electronic device cannot be determined.

In view of the foregoing problems, in embodiments of this application, the second electronic device may send a first ultrasonic signal by using a speaker, the first electronic device may determine, based on the first ultrasonic signal, information about a first angle that is between the first electronic device and the second electronic device, and then a user may rotate the first electronic device. After the user rotates the first electronic device, the second electronic device may send a second ultrasonic signal by using the speaker again, and the first electronic device may determine, based on the second ultrasonic signal, information about a second angle that is between the first electronic device and the second electronic device. The first electronic device may determine, based on the information about the first angle, the information about the second angle, and a rotation angle of the first electronic device, a target angle of the second electronic device relative to the first electronic device, and output a first directing signal to direct the user to search for the second electronic device. In other words, in a process in which the user rotates the first electronic device, the straight line in which the two microphones of the first electronic device are located is also rotated accordingly. Therefore, a coordinate system also changes accordingly. The angle of the second electronic device relative to the first electronic device may be determined by using the information that is about the first angle and that is obtained before rotation, the information that is about the second angle and that is obtained after rotation, and the rotation angle of the first electronic device, so that a problem that the angle of the second electronic device relative to the first electronic device cannot be determined through one time of measurement is avoided.

The following describes in detail embodiments of this application in FIG. 8 to FIG. 18.

FIG. 8 shows a method 800 for directing a user according to an embodiment of this application. In the method 800, a first electronic device includes at least two microphones, and a distance between the two microphones is greater than a preset distance. As shown in FIG. 8, the method 800 includes the following steps.

S801: The first electronic device receives a first operation instruction entered by a user.

Optionally, the first electronic device may receive, by using an application, the first operation instruction entered by the user.

If the user wants to search for a second electronic device based on the first electronic device, the user may enter the first operation instruction on a display interface of the first electronic device, or the first operation instruction may be a voice instruction.

Optionally, before S801, the second electronic device may register with the first electronic device, and the user may set a name of the second electronic device on the first electronic device. For example, the user places the second electronic device in a wallet, to find the wallet by using the second electronic device in the wallet when the wallet is lost. Before S801, the user may set the second electronic device as a wallet device on the first electronic device. When the user wants to search for the wallet, the user starts the "Search" application in FIG. 2 of the first electronic device, and taps the "wallet device" on a display interface of the "Search" application shown in FIG. 9, to complete S801. For another example, after starting the "Search" application, the user gives a voice instruction "Please help me find the wallet device", to complete S801. For still another example, the user may give a voice instruction "Xiaoyi, Xiaoyi, please help me find a device", and a voice assistant may schedule the "Search" application to enable a function of searching for the wallet device.

S802: In response to the first operation instruction, the first electronic device sends a first notification message to the second electronic device, and the second electronic device receives the first notification message from the first electronic device, where the first notification message is for notifying the second electronic device to send an ultrasonic signal.

Optionally, S802 includes: the first electronic device sends the first notification message to the second electronic device through a Bluetooth™ connection. Optionally, before S802, the first electronic device establishes the Bluetooth™ connection to the second electronic device.

Optionally, S802 includes: the first electronic device sends the first notification message to the second electronic device through a Wi-Fi™ connection. Optionally, before S802, the first electronic device establishes the Wi-Fi™ connection to the second electronic device.

In response to S801, the second electronic device performs S802.

S803: The second electronic device sends a first ultrasonic signal to the first electronic device by using a speaker, and the first electronic device receives the first ultrasonic signal by using the two microphones.

Optionally, the two microphones used by the first electronic device to receive the first ultrasonic signal may be a first microphone and a second microphone.

It may be understood that the first electronic device receives the first ultrasonic signal by using the two microphones may be understood as that both the two microphones can receive the first ultrasonic signal sent by by the speaker of the second electronic device, or both the two microphones can perform audio signal sampling on the first ultrasonic signal sent by the speaker of the second electronic device.

Optionally, a transmission distance of the first ultrasonic signal may be a set distance, for example, 20 meters. In other words, the first electronic device may determine an angle of a device within a range of 20 meters relative to the first electronic device.

Optionally, a plurality of microphones may be disposed in the first electronic device, and the plurality of microphones include the two microphones that receive the first ultrasonic signal.

Optionally, if the first electronic device includes a plurality of microphones, the two microphones that receive the first ultrasonic signal may be any two of the plurality of microphones. For example, if the first electronic device is a mobile phone, one microphone is disposed at the top of the mobile phone, one microphone is disposed at the bottom of the mobile phone, and one microphone is disposed at a central part of the mobile phone, the two microphones that receive the first ultrasonic signal may be any two of the three microphones.

Optionally, if the first electronic device includes a plurality of microphones, the two microphones that receive the first ultrasonic signal may be two microphones that are farthest from each other in the plurality of microphones. Optionally, if there are more than two microphones that are farthest from each other in the plurality of microphones, the two microphones that receive the first ultrasonic signal may be any two of the more than two microphones. For example, if the first electronic device is a mobile phone, one microphone is disposed at the top of the mobile phone, one microphone is disposed at the bottom of the mobile phone, and one microphone is disposed at a central part of the mobile phone, the two microphones that receive the first ultrasonic signal may be the microphones disposed at the top and bottom of the mobile phone. In this way, a relative distance between the two microphones is long. When an angle of the second electronic device relative to the first electronic device is calculated, D in FIG. 3 to FIG. 5 is large. Because $$\theta = 90° - \arcsin \frac{v \cdot \tau *}{f_S \cdot D},$$

when D is large, a case in which a large error of $$\frac{v \cdot \tau *}{f_s \cdot D}$$

is caused by an error of a sampling point $\tau *$, and then causes a large error of $\theta$ can be avoided. In other words, when D is large, a slight change of $\tau *$ does not cause a large change of $\theta$, so that accuracy of determining $\theta$ can be improved.

S804: The first electronic device determines information about a first angle based on the first ultrasonic signal received by the two microphones.

Optionally, the information about the first angle indicates a possible angle of the second electronic device relative to the first electronic device. For example, the information about the first angle indicates the first angle and a second angle, where the second angle is an angle opposite to the first angle, and the first angle and the second angle are possible angles of the second electronic device relative to the first electronic device. For example, if the first angle is 30 degrees, and the second angle is −30 degrees, it indicates that the angle of the second electronic device relative to the first electronic device may be 30 degrees or −30 degrees.

Figure 10:
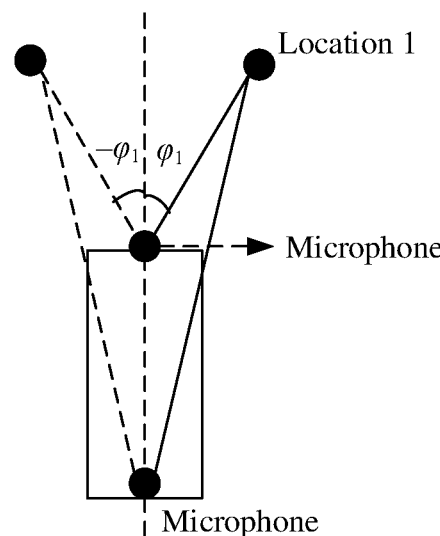
FIG. 10 is a diagram of information about a first angle according to an embodiment of this application.
Figure 11:
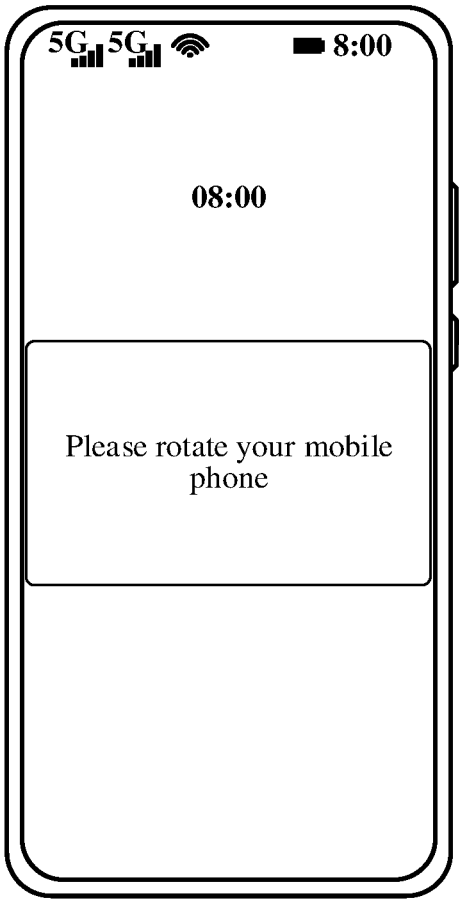
FIG. 11 is a diagram of displaying a first prompt signal on a display of a first electronic device according to an embodiment of this application.

For example, the information about the first angle indicates $\varphi_{11}$ and $\varphi_{12}$, and as shown in FIG. 10, $\varphi_{11}=\varphi_1$ and $\varphi_{12}=-\varphi_1$.

Optionally, the first electronic device may determine information about the first angle according to the principle shown in FIG. 4 or FIG. 5.

S805: The first electronic device outputs a first prompt signal, where the first prompt signal is for prompting the user to rotate the first electronic device.

Optionally, the first electronic device may display the first prompt signal on a display of the first electronic device. For example, the first prompt signal is "Please rotate your mobile phone" shown in FIG. 11. After the user sees "Please rotate your mobile phone" on the display, the user performs an action of rotating the mobile phone. For another example, the first electronic device may play, on the display of the first electronic device, an animation indicating the user to rotate the mobile phone.

Optionally, the first electronic device may alternatively output a first prompt signal of a voice type, so that the user can also obtain the first prompt signal when not viewing the display of the first electronic device. For example, the first electronic device is the mobile phone, and the first prompt signal may be "Please rotate your mobile phone". After the user hears "Please rotate your mobile phone", the user performs an action of rotating the mobile phone.

Optionally, the first prompt signal may alternatively prompt the user of a rotation angle or a rotation angle range. For example, content displayed in FIG. 11 may be replaced with "Please rotate your mobile phone by 30 degrees to 150 degrees", may be replaced with "Please rotate your mobile phone by 50 degrees", or may be replaced with "Please rotate your mobile phone by any angle, but not by 180 degrees". It may be understood that, if the first prompt signal does not prompt the user of the rotation angle or the rotation angle range, the user may rotate the mobile phone by any angle.

Optionally, the first prompt signal may alternatively prompt the user of a rotation direction. For example, content displayed in FIG. 11 may be replaced with "Please rotate your mobile phone clockwise" or "Please rotate your mobile phone counterclockwise". Optionally, the first prompt signal may alternatively prompt the user of a rotation direction and a rotation angle, or prompt the user of a rotation direction and a rotation angle range. For example, content displayed in FIG. 11 may be replaced with "Please rotate your mobile phone clockwise by 30 degrees to 150 degrees", or may be replaced with "Please rotate your mobile phone clockwise by 50 degrees". It may be understood that if the first prompt signal does not prompt the user of the rotation direction, the user may rotate the mobile phone in any direction.

It may be understood that there is no limitation on an execution sequence of S805 and S804, and S805 may be performed before, after, or simultaneously with S804.

S806: The first electronic device detects the rotation angle by which the user rotates the first electronic device.

Optionally, a gyroscope sensor of the first electronic device may detect the rotation angle by which the user rotates the first electronic device. For example, the first electronic device is the electronic device 100 shown in FIG. 1, and the gyroscope sensor 180B of the electronic device 100 may detect the rotation angle by which the user rotates the first electronic device.

Optionally, the rotation angle by which the user rotates the first electronic device may be any angle.

Optionally, the rotation angle by which the user rotates the first electronic device may not be equal to 180 degrees. This avoids a case in which after the user rotates the first electronic device, a straight line in which the two microphones of the first electronic device are located does not change, and consequently, an angle indicated by information that is about the second angle and that is determined after rotation is equal to an angle indicated by the information that is about the first angle and that is determined before rotation.

Optionally, an angle of clockwise rotation may be set to a positive value, and an angle of counterclockwise rotation may be set to a negative value. If the user rotates the first electronic device clockwise, the first electronic device detects that the rotation angle by which the user rotates the first electronic device is a positive value. If the user rotates the first electronic device counterclockwise, the first electronic device detects that the rotation angle by which the user rotates the first electronic device is a negative value.

Optionally, if the first prompt signal prompts the user of the rotation angle and/or the rotation direction in S805, in S806, the first electronic device still needs to detect the rotation angle by which the user rotates the first electronic device, to verify a rotation angle of the user. Even if the user does not rotate the first electronic device by the angle or in the direction indicated by the first prompt signal, the rotation angle by which the user rotates the first electronic device and that is detected by the first electronic device is used.

S807: The first electronic device sends a second notification message to the second electronic device, and the second electronic device receives the second notification message from the first electronic device, where the second notification message is for notifying the second electronic device to send an ultrasonic signal.

S806 may trigger S807. After the first electronic device detects the rotation angle by which the user rotates the first electronic device, the first electronic device is triggered to send the second notification message to the second electronic device.

Optionally, S807 includes: The first electronic device sends the second notification message to the second electronic device through the Bluetooth™ connection. Optionally, before S807, the first electronic device establishes the Bluetooth™ connection to the second electronic device.

Optionally, S807 includes: The first electronic device sends the second notification message to the second electronic device through the Wi-Fi™ connection. Optionally, before S807, the first electronic device establishes the Wi-Fi™ connection to the second electronic device.

In response to S807, the second electronic device performs S808.

S808: The speaker of the second electronic device sends a second ultrasonic signal to the first electronic device, and the first electronic device receives the second ultrasonic signal by using the two microphones.

Optionally, a transmission distance of the second ultrasonic signal may be a set distance, for example, 20 meters. In other words, the first electronic device may determine an angle of a device within a range of 20 meters relative to the first electronic device.

S809: The first electronic device determines the information about the second angle based on the second ultrasonic signal received by the two microphones.

It may be understood that, that the first electronic device receives the second ultrasonic signal by using the two microphones may be understood as that both the two microphones can receive the second ultrasonic signal sent by the first electronic device, or both the two microphones can perform audio signal sampling on the second ultrasonic signal sent by the speaker of the second electronic device.

Optionally, the two microphones that receive the second ultrasonic signal in S809 are the same as the two microphones that receive the first ultrasonic signal in S803. In other words, the first electronic device receives the first ultrasonic signal and the second ultrasonic signal by using the two microphones.

Optionally, the information about the second angle indicates a possible angle of the second electronic device relative to the first electronic device. For example, the information about the second angle indicates a fifth angle and a sixth angle, where the sixth angle is an angle opposite to the fifth angle, and the fifth angle and the sixth angle are possible angles of the second electronic device relative to the first electronic device. For example, if the fifth angle is 50 degrees, and the sixth angle is −50 degrees, it indicates that the angle of the second electronic device relative to the first electronic device may be 50 degrees or −50 degrees.

Figure 12:
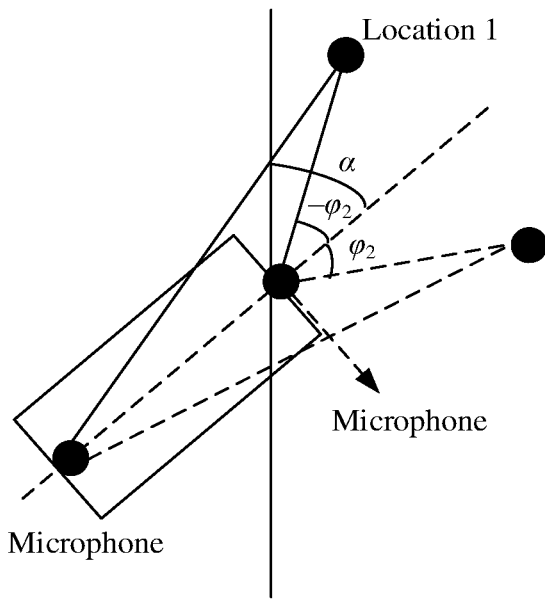
FIG. 12 is a diagram of a rotation angle of a first electronic device according to an embodiment of this application.
Figure 13:
FIG. 13 is a diagram of a first directing signal displayed on a display of a first electronic device according to an embodiment of this application.

For example, the fifth angle indicated by the information about the second angle is $\varphi_{12}$, and the sixth angle is $\varphi_{22}$, and as shown in FIG. 12, $\varphi_{21}=\varphi_2$, and $\varphi_{22}=-\varphi_2$. For example, if the fifth angle is 50 degrees, and the sixth angle is −50 degrees, it indicates that the angle of the second electronic device relative to the first electronic device may be 50 degrees or −50 degrees. The a as shown in FIG. 12 is the rotation angle that is of the first electronic device and that is detected by the first electronic device. As shown in FIG. 10 and FIG. 12, locations of the speakers that are of the second electronic device and that send the first ultrasonic signal and the second ultrasonic signal remain unchanged, or locations of the speakers of the second electronic device barely change in short time. For example, either of the locations is a location 1. Certainly, the location 1 marked in FIG. 10 and FIG. 12 is for ease of understanding, and the first electronic device does not know the location 1.

Optionally, the first electronic device may determine the information about the second angle according to the principle shown in FIG. 4 or FIG. 5.

S810: The first electronic device determines, based on the information about the first angle, the information about the second angle, and the rotation angle of the first electronic device, a target angle of the second electronic device relative to the first electronic device.

Optionally, S810 includes: The first electronic device determines information about a third angle based on the rotation angle of the first electronic device and the information about the first angle. The first electronic device determines the target angle based on the information about the third angle and the information about the second angle.

Optionally, that the first electronic device determines information about a third angle based on the rotation angle of the first electronic device and the information about the first angle includes: subtracting the rotation angle of the first electronic device from the first angle indicated by the information about the first angle, to obtain the third angle; and subtracting the rotation angle of the first electronic device from the second angle indicated by the information about the first angle, to obtain a fourth angle, where the information about the third angle indicates the third angle and the fourth angle. In other words, because the user rotates the first electronic device, it is equivalent to a case that a coordinate system that is of the first electronic device and that is obtained when the first electronic device determines the information about the first angle is also rotated. For example, if the first electronic device detects that the rotation angle of the first electronic device is α degrees, it is equivalent to a case that the coordinate system that is of the first electronic device and that is obtained when the first electronic device determines the information about the first angle is also rotated by α degrees. Therefore, it is equivalent to a case that after the coordinate system is rotated, an angle indicated by the information about the first angle also needs to be correspondingly transformed.

Figure 9:
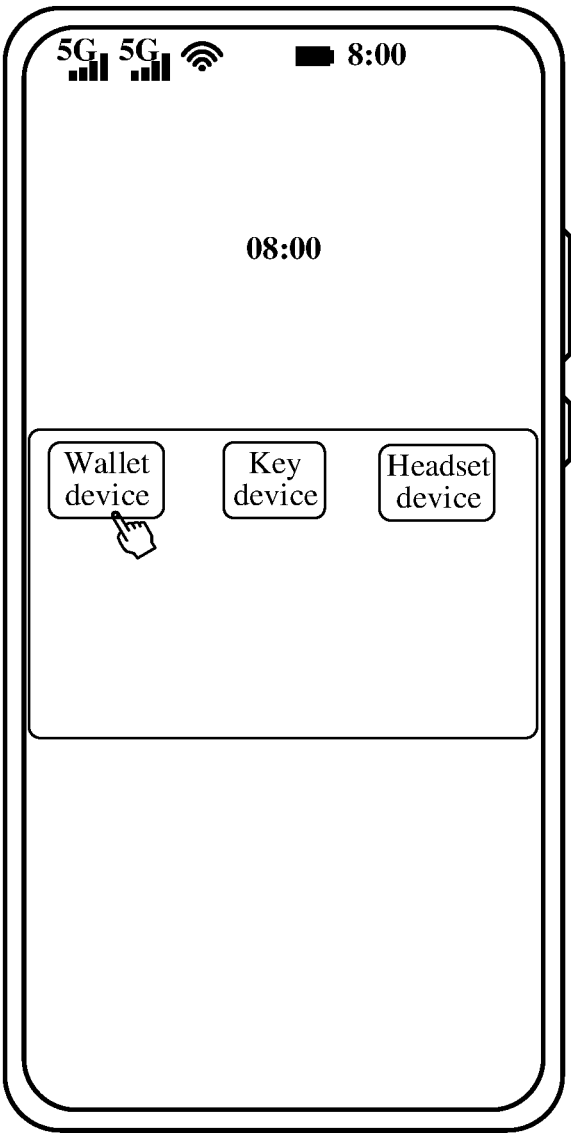
FIG. 9 is a diagram of a display interface of a first electronic device according to an embodiment of this application.

For example, if the first angle in FIG. 9 is $j_{11}=j_1$, the second angle is $j_{12}=-j_1$, and the rotation angle of the first electronic device is α degrees shown in FIG. 12, the third angle is $j_{11}'=j_1-\alpha$, and the fourth angle is $j_{12}'=-j_1-\alpha$.

Optionally, that the first electronic device determines the target angle based on the information about the third angle and the information about the second angle includes: The first electronic device determines two closest angles in the third angle, the fourth angle, the fifth angle, and the sixth angle. The first electronic device determines the target angle based on the two closest angles. Optionally, that the first electronic device determines the target angle based on the two closest angles includes: The first electronic device determines either of the two closest angles as the target angle, or the first electronic device determines an average value of the two closest angles as the target angle.

In other words, with reference to FIG. 10 and FIG. 12, the target angle is two closest angles in $\varphi_{11}'$, $\varphi_{12}'$, $\varphi_{21}$ and $\varphi_{22}$. For example, $|j_{11}'-j_{21}|$, $|j_{11}'-j_{22}|$, and $|j_{12}'-j_{22}|$, may be compared to determine two angles corresponding to a smallest value in $|j_{11}'-j_{21}|$, $|j_{11}'-j_{22}|$, $|j_{12}'-j_{21}|$ and $|j_{12}'-j_{22}|$ as the two closest angles. For example, if $\varphi_{11}=30°$, $\varphi_{11}=-30°$, and the rotation angle of the first electronic device is $\alpha=60°$, $j_{11}'=-30°$ and $j_{12}'=-90°$. If $\varphi_{21}=30°$ and $j_{22}=-30°$, $|j_{11}'-j_{21}|=60°$, $|j_{11}'-j_{22}|=0$, $j_{12}'-j_{21}|=120°$, and $|j_{12}'-j_{22}|=60°$. Therefore, the target angle is determined based on the two angles $\varphi_{11}'$ and $\varphi_{22}$, that is, the target angle is $-30°$ obtained through the rotation performed by the user, that is, the angle of the second electronic device relative to the first electronic device is $-30°$. In other words, because the second electronic device basically does not move, in the four angles determined by the first electronic device through two times of measurement, if two angles are close, it indicates that the two angles are angles of the second electronic device relative to the first electronic device. In other words, if an angle of the second electronic device relative to the first electronic device cannot be determined through one time of measurement, because a location of the second electronic device before and after rotation of the first electronic device is basically unchanged, results of the two times of measurement before and after the rotation may be compared, to determine a location of the second electronic device relative to the first electronic device.

S811: The first electronic device outputs a first directing signal, where the first directing signal is for directing the user to search for the second electronic device based on the target angle.

Optionally, the first directing signal may be a signal displayed on the display interface of the first electronic device. For example, with reference to the foregoing examples, if the target angle is $-30°$, the first electronic device displays directing shown in FIG. 13.

Optionally, the first directing signal may be a voice signal. For example, the first electronic device plays "The second electronic device is in a direction of $-30°$."

Figure 15:
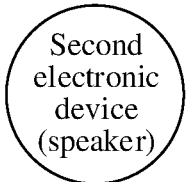
FIG. 15 is a diagram of a first directing signal and a second directing signal that are displayed on a display of a first electronic device according to an embodiment of this application.

Optionally, as described in the foregoing method 800, the first electronic device determines the information about the first angle by using the first ultrasonic signal, and determines the information about the second angle by using the second ultrasonic signal. The first electronic device may further determine signal strength of the first ultrasonic signal, and/or determine signal strength of the second ultrasonic signal. In this way, the first electronic device may display the signal strength on the display interface of the first electronic device. For example, as shown in FIG. 15, a second directing signal may indicate that the signal strength becomes lower. If the user sees high signal strength on the display interface of the first electronic device, it indicates that the second electronic device is near the first electronic device, and the user may search for the second electronic device around the first electronic device based on the first directing signal. If the user sees low signal strength on the display interface of the first electronic device, it indicates that the second electronic device is far away from the first electronic device. Therefore, the user searches for the second electronic device at a distance far away from the first electronic device based on the first directing signal. In other words, an ultrasonic signal used by the first electronic device to determine the signal strength may be referred to as a third ultrasonic signal.

If the first ultrasonic signal and/or the second ultrasonic signal are/is for determining the signal strength, the first ultrasonic signal may be referred to as the third ultrasonic signal, or the second ultrasonic signal may be referred to as the third ultrasonic signal.

Figure 14:
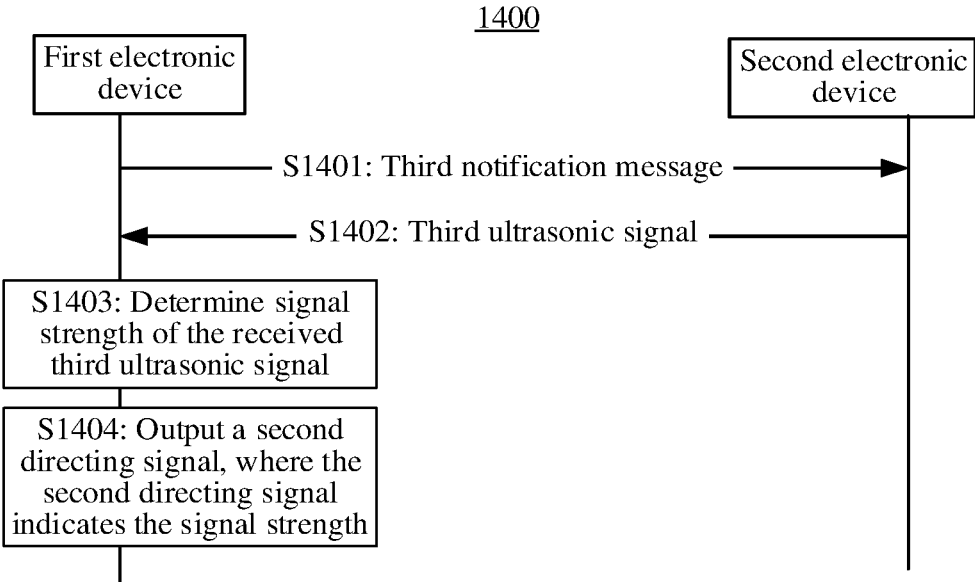
FIG. 14 is a diagram of another method for directing a user according to an embodiment of this application.

After the method 800, optionally, the first electronic device may continue to send a third notification message to the second electronic device, to notify the second electronic device to continue to send the third ultrasonic signal based on the third notification message. The first electronic device may direct, based on determined signal strength of the third ultrasonic signal sent by the second electronic device, the user to search for the second electronic device. With reference to FIG. 14, the following describes in detail a method 1400 in which a first electronic device directs a user to search for a second electronic device. It may be understood that a method embodiment in FIG. 14 may be after the method embodiment in FIG. 8. After determining a target angle of the second electronic device relative to the first electronic device, the first electronic device may use the method embodiment in FIG. 14 to direct the user to search for the second electronic device. As shown in FIG. 14, the method 1400 may include the following steps.

S1401: The first electronic device sends a third notification message to the second electronic device, and the second electronic device receives the third notification message from the first electronic device, where the third notification message is for notifying the second electronic device to send an ultrasonic signal.

Optionally, any step of S809 to S811 may trigger execution of S1401.

Optionally, after detecting that the first electronic device moves, the first electronic device is triggered to perform S1401.

Optionally, S1401 includes: The first electronic device sends the third notification message to the second electronic device through a Bluetooth™ connection. Optionally, before S1401, the first electronic device establishes the Bluetooth™ connection to the second electronic device.

Optionally, S1401 includes: The first electronic device sends the third notification message to the second electronic device through a Wi-Fi™ connection. Optionally, before S1401, the first electronic device establishes the Wi-Fi™ connection to the second electronic device.

In response to S1401, the second electronic device performs S1402.

S1402: The second electronic device sends a third ultrasonic signal to the first electronic device by using a speaker, and the first electronic device receives the third ultrasonic signal from the second electronic device.

Optionally, the first electronic device may receive the third ultrasonic signal from the second electronic device by using a third microphone.

It may be understood that, in a process of combining the method 800 and the method 1400, the third microphone used by the first electronic device to receive the third ultrasonic signal and the first microphone and the second microphone used by the first electronic device to receive the first ultrasonic signal and the second ultrasonic signal may be different microphones or a same microphone. In other words, in the method 800, the information about the first angle is determined based on the first ultrasonic signals received by the two different microphones, and the information about the second angle is determined based on the second ultrasonic signals received by the two different microphones. The third ultrasonic signal in S1402 is for determining signal strength. Therefore, the third microphone that receives the third ultrasonic signal may be related to or unrelated to the first microphone and the second microphone.

S1403: The first electronic device determines signal strength of the received third ultrasonic signal.

Optionally, the signal strength of the third ultrasonic signal may be average signal strength corresponding to a sampling point of the third ultrasonic signal.

Optionally, S1401 to S1403 may be repeatedly performed, so that the first electronic device determines a plurality of pieces of signal strength, and the first electronic device may update the signal strength in real time. In other words, in a process in which the user searches for the second electronic device, the user may be moving while holding the first electronic device. In a process of the movement, the second electronic device continues to send the third ultrasonic signal, and the first electronic device may determine, based on the signal strength of the third ultrasonic signal sent by the second electronic device, whether the user is approaching the second electronic device or is moving away from the second electronic device. If the signal strength of the third ultrasonic signal sent by the second electronic device is high, it indicates that the first electronic device is approaching the second electronic device. If the signal strength of the third ultrasonic signal sent by the second electronic device is low, it indicates that the first electronic device is moving away from the second electronic device.

S1404: The first electronic device outputs a second directing signal, where the second directing signal indicates the signal strength.

Figure 16:
FIG. 16 is a diagram of another first directing signal and another second directing signal that are displayed on a display of a first electronic device according to an embodiment of this application.

Optionally, the second directing signal may be a signal displayed on a display interface of the first electronic device. For example, the second directing signal may indicate whether the signal strength becomes lower or higher. As shown in FIG. 15, the second directing signal may indicate that the signal strength becomes lower. For another example, the second directing signal may be that the first electronic device is moving away from the second electronic device or is approaching the second electronic device, and that the first electronic device is moving away from the second electronic device or is approaching the second electronic device reflects the signal strength. As shown in FIG. 16, that you are moving away from the second electronic device may be displayed on the display interface of the first electronic device. After the user sees "You are moving away from the second electronic device," the user may attempt to approach the second electronic device in another direction.

Optionally, the second directing signal may be a voice signal. For example, the first electronic device plays "You are moving away from a wallet device" or "You are approaching a wallet device."

Optionally, step S1402 may not be performed, and the first electronic device directly determines corresponding signal strength by using the first ultrasonic signal sent by the second electronic device in step S803, or by using the second ultrasonic signal sent by the second electronic device in step S808, for example, determines the signal strength of the first ultrasonic signal or determines the signal strength of the second ultrasonic signal, and then indicates the signal strength, or indicates, based on the signal strength, a distance between the first electronic device and the second electronic device, or indicates, based on the signal strength, whether the first electronic device is approaching the second electronic device or is moving away from the second electronic device. This solution is equivalent to a case that based on a same signal, an angle of the second electronic device relative to the first electronic device is determined and information about a change of relative locations of the second electronic device and the first electronic device is also determined. This can reduce signaling overheads of the first electronic device and the second electronic device, and reduce processing burden.

In an implementation process, the first electronic device may further determine the distance between the first electronic device and the second electronic device based on the first ultrasonic signal, the second ultrasonic signal, or the third ultrasonic signal. For example, the distance is determined based on the signal strength of the first ultrasonic signal, the signal strength of the second ultrasonic signal, or the signal strength of the third ultrasonic signal, so that both the angle and the distance can be indicated, and a location of the second electronic device can be more accurately determined. For another example, the first electronic device may determine the distance based on a receiving moment of the first ultrasonic signal, a receiving moment of the second ultrasonic signal, or a receiving moment of the third ultrasonic signal.

The following describes, in three cases, a principle in which the first electronic device determines the distance between the first electronic device and the second electronic device based on the third ultrasonic signal. A principle in which the first electronic device determines the distance between the first electronic device and the second electronic device based on the first ultrasonic signal or the second ultrasonic signal is similar to the principle in which the first electronic device determines the distance between the first electronic device and the second electronic device based on the third ultrasonic signal. To avoid repetition, details are not described.

Case 1: The first electronic device determines the distance between the first electronic device and the second electronic device based on the signal strength of the received third ultrasonic signal. For example, the first electronic device determines the distance between the second electronic device and the first electronic device based on average signal strength of the received third ultrasonic measurement signal. It is assumed that the distance between the second electronic device and the first electronic device is d, and the average signal strength of the third ultrasonic signal is $\rho$, where $$\rho = \frac{\alpha}{d^2}.$$

In this case, $d=\sqrt{\alpha/\rho}$, where $\alpha$ is a constant coefficient. For example, $\alpha$ is related to ultrasonic transmit power, or $\alpha$ is related to ultrasonic transmit power and blockage between the first electronic device and the second electronic device.

Case 2: If the Bluetooth™ connection exists between the first electronic device and the second electronic device, the second electronic device sends a first Bluetooth™ signal while sending the third ultrasonic signal, and the first electronic device receives the third ultrasonic signal and the first Bluetooth™ signal. The first electronic device determines the distance between the first electronic device and the second electronic device based on a difference between a moment at which the third ultrasonic signal is received and a moment at which the first Bluetooth™ signal is received. It is assumed that the distance between the first electronic device and the second electronic device is d, the second electronic device sends the first Bluetooth™ signal and the third ultrasonic signal at a moment T0, and the first electronic device receives the first Bluetooth™ signal at a moment T1, and receives the third ultrasonic signal at a moment T2, that is, for the first electronic device, T1 and T2 are known values, and T0 is an unknown value. In other words, transmission time of the first Bluetooth™ signal is T1−T0=d/c, where c is a light speed, and c=3×10ˆ8 m/s. Transmission time of the third ultrasonic signal is T2−T0=d/v, where v is a sound speed, and the sound speed v is usually about 340 m/s. Therefore, a time difference between transmission of the third ultrasonic signal and transmission of the first Bluetooth™ signal is (T2−T0)−(T1−T0)=T2−T1=d/v−d/c, and therefore, d=(T2−T1)cv/(c−v). Alternatively, because c is large, d/c is approximately 0. Therefore, T2−T1≈d/v, and d≈(T2−T1)v.

Case 3: If the Bluetooth™ connection exists between the first electronic device and the second electronic device, the first electronic device may send a second Bluetooth™ signal to the second electronic device, and the first electronic device determines the distance between the first electronic device and the second electronic device by using a sum of transmission time of the third ultrasonic signal and transmission time of the second Bluetooth™ signal. Alternatively, the first electronic device determines the distance between the first electronic device and the second electronic device by using a difference between a moment at which the third ultrasonic signal is received and a moment at which the second Bluetooth™ signal is received. It is assumed that the distance between the first electronic device and the second electronic device is d, the first electronic device sends the second Bluetooth™ signal at a moment T3, the second electronic device receives the second Bluetooth™ signal at a moment T4, the second electronic device sends the third ultrasonic signal after a preset time interval T, and the first electronic device receives the third ultrasonic signal at a moment T5. Transmission time of the second Bluetooth™ signal is T4−T3=d/c, where c is a light speed, and c=3×10ˆ8 m/s. Transmission time of the third ultrasonic signal is T5−(T4+T)=d/v, where v is a sound speed, and the sound speed v is usually about 340 m/s. In other words, the preset time interval T is known. For the first electronic device, T3, T, and T5 are known, and T4 is unknown. The sum of the transmission time of the third ultrasonic signal and the transmission time of the second Bluetooth™ signal is (T5−(T4+T))+(T4−T3)=d/v+d/c, and therefore, d=vc(T5−T−T3)/(c+v). Alternatively, because c is large, d/c is approximately 0. Therefore, T4−T3 is approximately 0, that is, T4 is approximately equal to T3, and therefore, d/v=T5−(T4+T)≈T5−(T3+T). Therefore, d≈(T5−(T3+T))v=(T5−T3−T)v, where T5−T3 is the difference between the moment at which the first electronic device receives the third ultrasonic signal and the moment at which the second Bluetooth™ signal is received.

Optionally, after determining the distance between the first electronic device and the second electronic device based on any one of the foregoing cases, the first electronic device may further display the distance between the first electronic device and the second electronic device on a display of the first electronic device, to prompt the user to search for the second electronic device. In other words, a first directing signal and the distance may be displayed on the display of the first electronic device, a first directing signal and the signal strength may be displayed, or a first directing signal, the distance, and the signal strength may be displayed. This is not limited in this embodiment of this application.

Optionally, after the first electronic device determines the distance between the first electronic device and the second electronic device, the first electronic device may detect a movement angle and/or a movement distance of the first electronic device, and the first electronic device prompts the user based on the movement angle and/or the movement distance of the first electronic device, the distance between the second electronic device and the first electronic device, and the target angle, that is, the first electronic device may prompt the user at any time based on a change of a real-time location of the first electronic device and the location of the second electronic device.

Optionally, when both the first directing signal and the second directing signal are voice signals, the first electronic device may simultaneously output the first directing signal and the second directing signal. For example, the first electronic device plays "You are moving away from a wallet device that is in a direction of −30°" or "You are approaching a wallet device that is in a direction of −30°."

Optionally, in a process in which the user moves while holding the first electronic device to search for the second electronic device, the first electronic device may deviate from the second electronic device. Therefore, the first electronic device may also continue to determine, by using the third ultrasonic signal in the method 1400, the target angle of the second electronic device relative to the first electronic device. A manner of determining, based on the third ultrasonic signal, the target angle of the second electronic device relative to the first electronic device is similar to the determining manner in the method 800. To avoid repetition, details are not described. That is, the first electronic device may determine, by using the third ultrasonic signal, the target angle of the second electronic device relative to the first electronic device, and may determine the signal strength by using the third ultrasonic signal.

As described in the foregoing method 800, the second electronic device may send the first ultrasonic signal based on the first notification message sent by the first electronic device, and send the second ultrasonic signal based on the second notification message sent by the first electronic device. That is, as described in the method 800, the first electronic device needs to send the notification message to trigger the second electronic device to send the ultrasonic signal. In the method 1400, the second electronic device may send the third ultrasonic signal based on the third notification message sent by the first electronic device. Optionally, alternatively, the second electronic device may periodically send the ultrasonic signal. With reference to FIG. 17, the following provides descriptions that the second electronic device periodically sends the ultrasonic signal, where the ultrasonic signal periodically sent by the second electronic device includes the first ultrasonic signal and the second ultrasonic signal.

FIG. 17 shows a method 1700 for directing a user. The method 1700 may include the following steps.

S1701: A first electronic device receives a first operation instruction entered by the user.

It may be understood that S1701 is the same as S801. To avoid repetition, details are not described.

S1702: In response to the first operation instruction, the first electronic device sends a third notification message to a second electronic device, and the second electronic device receives the third notification message, where the third notification message is for notifying the second electronic device to periodically send an ultrasonic signal.

Optionally, S1702 includes: The first electronic device sends the third notification message to the second electronic device through a Bluetooth™ connection. Optionally, before S1702, the first electronic device establishes the Bluetooth™ connection to the second electronic device.

Optionally, S1702 includes: The first electronic device sends the third notification message to the second electronic device through a Wi-Fi™ connection. Optionally, before S1702, the first electronic device establishes the Wi-Fi™ connection to the second electronic device.

In response to S1701, the second electronic device performs S1702.

S1703: The second electronic device sends a first ultrasonic signal to the first electronic device by using a speaker, and the first electronic device receives the first ultrasonic signal by using two microphones.

In other words, the third notification message may trigger the second electronic device to periodically send the ultrasonic signal, and the first ultrasonic signal may be one of the ultrasonic signals periodically sent by the second electronic device.

Optionally, a periodicity for the second electronic device to send the ultrasonic signal may be specified in a protocol or determined by the first electronic device and the second electronic device through negotiation. This is not limited in this embodiment of this application.

Optionally, in response to the third notification message, the second electronic device may send a preset quantity of ultrasonic signals. For example, after receiving the third notification message, the second electronic device may send P ultrasonic signals, and stop sending after sending the P ultrasonic signals, where P is a positive integer greater than or equal to 2. In this way, the second electronic device can be prevented from sending the ultrasonic signal without stopping, so that power consumption of the second electronic device can be reduced. Optionally, after receiving the third notification message, the second electronic device may periodically send P ultrasonic signals, and stop sending after periodically sending the P ultrasonic signals. The P ultrasonic signals may include the first ultrasonic signal and a second ultrasonic signal.

For descriptions of the two microphones of the first electronic device, refer to the descriptions of S803.

S1704 to S1706 are respectively the same as S804 to S806.

S1707: The second electronic device sends the second ultrasonic signal to the first electronic device by using the speaker, and the first electronic device receives the second ultrasonic signal by using the two microphones.

Optionally, between S1703 and S1707, the second electronic device may further send another ultrasonic signal based on the periodicity for sending the ultrasonic signal. However, because the first electronic device has not detected a rotation angle of the first electronic device, the first electronic device may not receive the ultrasonic signal or may discard the received ultrasonic signal and perform no processing. The second ultrasonic signal may be an ultrasonic signal received by the first electronic device after the first electronic device detects the rotation angle of the first electronic device.

S1708 to S1710 are respectively the same as S809 to S811.

Optionally, similar to that in the method 1400, the first electronic device may determine signal strength by using a third ultrasonic signal periodically sent by the second electronic device, to output a second directing signal to direct the user to search for the second electronic device. Different from that in the method 1400, and similar to that in the method 1700, the second electronic device periodically sends the third ultrasonic signal, and the first electronic device does not need to send the third notification message to trigger the second electronic device to send the third ultrasonic signal.

Therefore, in the foregoing method embodiment, the first electronic device may determine information about a first angle based on the first ultrasonic signal sent by the second electronic device. After the user rotates the first electronic device, the first electronic device may determine information about a second angle based on the second ultrasonic signal sent by the second electronic device. The first electronic device determines, based on the information about the first angle, the information about the second angle, and the rotation angle of the first electronic device, a target angle of the first electronic device relative to the second electronic device, and the user searches for the second electronic device based on the target angle directed by a first directing signal. Therefore, that a unique angle of the second electronic device relative to the first electronic device cannot be determined can be avoided, so that locating, tracking, or the like of the second electronic device can be implemented.

Figure 18:
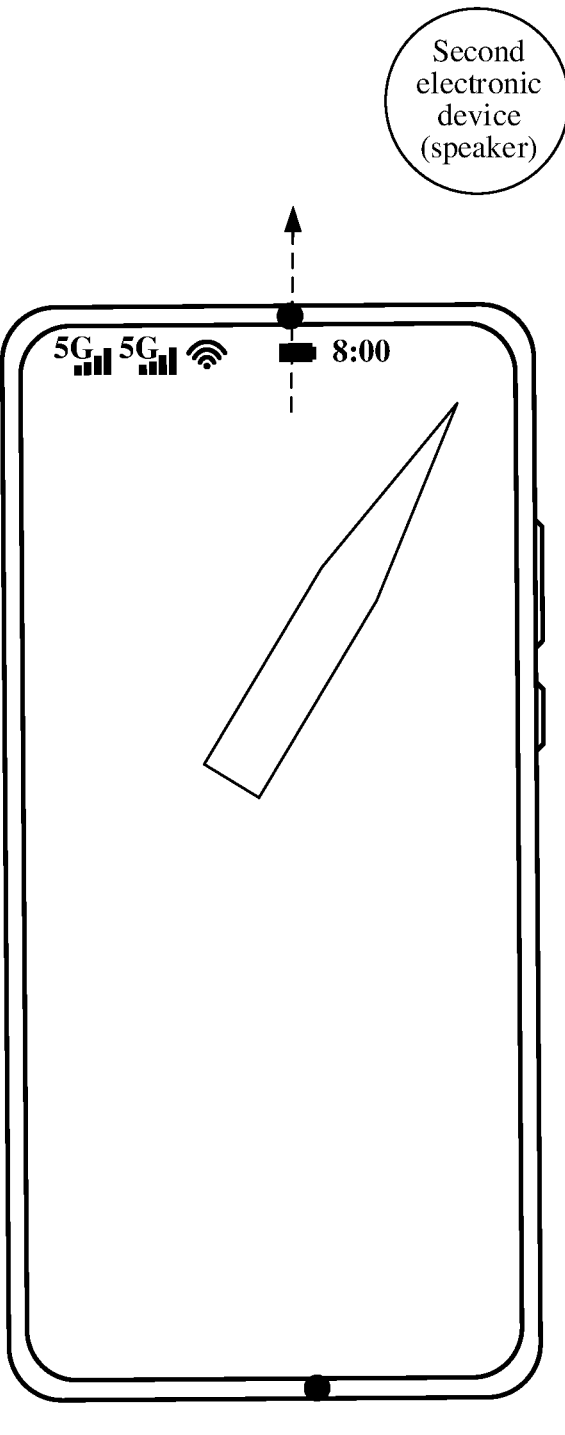
FIG. 18 is a diagram of a first directing signal displayed on a display of a first electronic device according to an embodiment of this application.

In some embodiments, in a process in which the user moves the first electronic device, the first electronic device may rotate. The first electronic device may detect a rotation angle of the first electronic device, and determine, based on the rotation angle of the first electronic device and the target angle, an angle for directing the user. In other words, the first electronic device may detect in real time whether the first electronic device deviates from the target angle. If the first electronic device deviates from the target angle, the first electronic device may direct the user to search for the second electronic device based on a deviation angle and the target angle. For example, for directing of a first directing signal in FIG. 13, the first directing signal directs that the second electronic device is at −30° from the first electronic device. When moving the first electronic device, the user does not move the first electronic device based on −30°, and the first electronic device detects that the first electronic device deviates by −60°. Therefore, the first electronic device calculates, based on the deviated −00° and −30°, that the second electronic device is at an orientation of 30° ((−30°)−(−60°)=30°) from the first electronic device, and displays the orientation as shown in FIG. 18.

In some embodiments, in the foregoing method embodiment, the first electronic device can determine the target angle, and the target angle determined by the first electronic device in the foregoing method embodiment is referred to as a previously determined target angle. After the first electronic device determines the previous target angle, the first electronic device may further rotate. A gyroscope of the first electronic device detects the rotation angle of the first electronic device, and sends a fourth notification message to the second electronic device, or after preset duration after the first electronic device determines the previous target angle, the first electronic device may send a fourth notification message to the second electronic device, where the fourth notification message is for triggering the second electronic device to send a fourth ultrasonic signal, and the first electronic device measures, based on the fourth ultrasonic signal, the angle of the second electronic device relative to the first electronic device. According to the principle shown in FIG. 4 or FIG. 5, the first electronic device measures, based on the fourth ultrasonic signal, the angle of the second electronic device relative to the first electronic device. The first electronic device may determine, based on the previous target angle, the rotation angle, and the angle that is of the second electronic device relative to the first electronic device and that is obtained through measurement based on the fourth ultrasonic signal, a current target angle of the first electronic device relative to the second electronic device. Optionally, because the angle that is of the second electronic device relative to the first electronic device and that is obtained by the first electronic device through measurement based on the fourth ultrasonic signal may be a positive value or a negative value. If a value obtained by subtracting the rotation angle from the previous target angle is close to a positive value, the current target angle is a positive value. If a value obtained by subtracting the rotation angle from the previous target angle is close to a negative value, the current target angle is a negative value. In other words, in a process in which the first electronic device determines the current target angle based on the fourth ultrasonic signal, because the angle obtained based on the fourth ultrasonic measurement signal may be two to-be-selected values, the first electronic device may determine the current target angle from the two to-be-selected values by using the previously obtained target angle and the rotation angle of the first electronic device. That is, the first electronic device may determine the local target angle by using the previously determined target angle, the rotation angle of the first electronic device, and an ultrasonic measurement signal sent by the second electronic device. For example, in the foregoing method embodiment, if it is determined that the previous target angle is $\varphi^{k-1}$, the rotation angle of the first electronic device is $\theta^k$, and the angle that is of the second electronic device relative to the first electronic device and that is obtained by the first electronic device through measurement based on the fourth ultrasonic signal is $\varphi_k$, a new target angle of the first electronic device relative to the second electronic device is $$\varphi^k = \arg\min_{\varphi\{-\varphi_k,\varphi_k\}} \left|\varphi - \left(\varphi^{k1} - \theta^k\right)\right| = \arg\min_{\varphi\{-\varphi_k,\varphi_k\}} \left|\varphi - \varphi^{k1} + \theta^k\right|,$$

where if the first electronic device does not rotate, $\theta^k=0$.

In some embodiments, if the second electronic device moves, and the user fails to find the second electronic device based on the directing of the first directing signal, the user may enter a second operation instruction to trigger, in response to the second operation instruction, the foregoing method procedure to start. For example, if after tapping the wallet device shown in FIG. 9, the user does not find the wallet device (where the second electronic device is the wallet device), the user may tap the "wallet device" shown in FIG. 9 again to initiate a searching process again.

It may be understood that the display interface in the foregoing method embodiment may be replaced with the display, and the display may be replaced with the display interface.

As described in the foregoing method embodiment, the first electronic device determines, based on the information that is about the first angle and that is obtained before the user rotates the first electronic device, the information that is about the second angle and that is obtained after the user rotates the first electronic device, and the rotation angle of the first electronic device, the target angle of the second electronic device relative to the first electronic device. In some embodiments, the user may rotate the first electronic device for a plurality of times, and the first electronic device may determine, by using information that is about an angle of the second electronic device relative to the first electronic device and that is obtained through the plurality of times of rotation and the plurality of times of rotation angles, the target angle of the second electronic device relative to the first electronic device. In this way, accuracy of determining the target angle can be improved through the plurality of times of rotation of the first electronic device. The first electronic device may display a prompt signal for a plurality of times, to prompt the user to perform rotation, to implement the plurality of times of rotation of the first electronic device.

It may be understood that, to implement the foregoing functions, the electronic devices include corresponding hardware and/or software modules for performing the functions. In combination with algorithm steps of the examples described in embodiments disclosed in this specification, this application may be implemented by hardware or a combination of hardware and computer software. Whether a function is performed by hardware or hardware driven by computer software depends on a particular application and a design constraint condition of the technical solutions. In combination with embodiments, a person skilled in the art may use different methods to implement the described functions for each particular application, but it should not be considered that the implementation goes beyond the scope of this application.

In this embodiment, division into functional modules may be performed on the electronic device based on the foregoing method examples. For example, division into each functional module, for example, a determining unit or a transmission unit, may be performed based on each corresponding function, or two or more functions may be integrated into one processing module. The integrated module may be implemented in a form of hardware. It should be noted that, in this embodiment, division into the modules is an example, is merely logical function division, and may be other division during actual implementation.

It should be noted that, all related content of steps in the foregoing method embodiments may be cited in function descriptions of corresponding functional modules. Details are not described herein again.

The electronic device provided in this embodiment is configured to perform the foregoing method for directing a user. Therefore, an effect same as that of the foregoing implementation method can be achieved.

When an integrated unit is used, each electronic device may further include a processing module, a storage module, and a communication module. The processing module may be configured to control and manage an action of the electronic device. The storage module may be configured to support the electronic device in storing program code, data, and the like. The communication module may be configured to support communication between the electronic device and another device.

The processing module may be a processor or a controller. The processing module may implement or execute logical blocks, modules, and circuits in various examples described with reference to content disclosed in this application. The processor may alternatively be a combination of processors implementing a computing function, including, for example, a combination of one or more microprocessors, or a combination of digital signal processing (DSP) and a microprocessor. The storage module may be a memory. The communication module may be a device, for example, a radio frequency circuit, a Bluetooth™ chip, or a Wi-Fi™ chip, that interacts with another electronic device.

In an embodiment, when the processing module is the processor, and the storage module is the memory, the electronic device in this embodiment may be a device with the structure shown in FIG. 1.

An embodiment further provides a computer storage medium. The computer storage medium stores computer instructions. When the computer instructions are run on an electronic device, the electronic device is enabled to perform the foregoing related method steps, to implement the method that is for directing a user and that is in the foregoing embodiment.

An embodiment further provides a computer program product. When the computer program product runs on a computer, the computer is enabled to perform the foregoing related steps, to implement the method that is for directing a user and that is in the foregoing embodiment.

In addition, an embodiment of this application further provides an apparatus. The apparatus may be a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the method that is for directing a user and that is in the foregoing method embodiments.

The electronic device, the computer storage medium, the computer program product, and the chip that are provided in embodiments are all configured to perform the corresponding method provided above. Therefore, for beneficial effects that can be achieved by the electronic device, the computer storage medium, the computer program product, and the chip, refer to the beneficial effects in the corresponding method provided above. Details are not described herein again.

The foregoing descriptions about implementations allow a person skilled in the art to understand that, for the purpose of convenient and brief description, division into the foregoing functional modules is merely used as an example for description. During actual application, the foregoing functions may be allocated to different functional modules for implementation based on a requirement. In other words, an inner structure of an apparatus is divided into different functional modules to implement all or some of the functions described above.

In several embodiments provided in this application, it should be understood that the disclosed apparatus and method may be implemented in another manner. For example, the described apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, the functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for a first electronic device directing a user, the method comprising:

determining, by the first electronic device and based on a first ultrasonic signal sent by a second electronic device, information about a first angle of the second electronic device relative to the first electronic device;

outputting, by the first electronic device, a first prompt signal, the first prompt signal prompting the user to rotate the first electronic device;

determining, by the first electronic device and based on a second ultrasonic signal sent by the second electronic device, information about a second angle of the second electronic device relative to the first electronic device; and outputting, by the first electronic device, a first directing signal based on the information about the first angle, the information about the second angle, and a rotation angle of the first electronic device, the first directing signal directing the user to search for the second electronic device.

2. The method according to claim 1, wherein the outputting a first directing signal based on the information about the first angle, the information about the second angle, and a rotation angle of the first electronic device comprises:

determining, based on the information about the first angle, the information about the second angle, and the rotation angle of the first electronic device, a target angle of the second electronic device relative to the first electronic device; and outputting the first directing signal based on the target angle, wherein the first directing signal is for directing the user to search for the second electronic device based on the target angle.

3. The method according to claim 2, wherein the determining, based on the information about the first angle, the information about the second angle, and the rotation angle of the first electronic device, a target angle of the second electronic device relative to the first electronic device comprises:

determining information about a third angle based on the rotation angle of the first electronic device and the information about the first angle; and determining the target angle based on the information about the second angle and the information about the third angle.

4. The method according to claim 3, wherein the information about the first angle indicates the first angle and the second angle, and the second angle is an angle opposite to the first angle, wherein the determining information about a third angle based on the rotation angle of the first electronic device and the information about the first angle comprises:

subtracting the rotation angle of the first electronic device from the first angle indicated by the information about the first angle, to obtain the third angle; and subtracting the rotation angle of the first electronic device from the second angle indicated by the information about the first angle, to obtain a fourth angle, wherein the information about the third angle indicates the third angle and the fourth angle.

5. The method according to claim 4, wherein the information about the second angle indicates a fifth angle and a sixth angle, and the sixth angle is an angle opposite to the fifth angle, wherein the determining the target angle based on the information about the second angle and the information about the third angle comprises:

determining two closest angles in the third angle, the fourth angle, the fifth angle, and the sixth angle; and determining the target angle based on the two closest angles.

6. The method according to claim 1, wherein the method further comprises:

sending a first notification message to the second electronic device in response to a first operation instruction, wherein the first notification message is for notifying the second electronic device to send an ultrasonic signal; and receiving the first ultrasonic signal from the second electronic device.

7. The method according to claim 1, wherein after the outputting a first prompt signal, the method further comprises:

sending a second notification message to the second electronic device, wherein the second notification message is for notifying the second electronic device to send an ultrasonic signal; and receiving the second ultrasonic signal from the second electronic device.

8. The method according to claim 1, wherein the method further comprises:

sending a third notification message to the second electronic device in response to a first operation instruction, wherein the third notification message is for notifying the second electronic device to periodically send an ultrasonic signal, and the ultrasonic signal periodically sent by the second electronic device comprises the first ultrasonic signal and the second ultrasonic signal.

9. The method according to claim 1, wherein the method further comprises:

determining signal strength of a received third ultrasonic signal; and outputting a second directing signal, wherein the second directing signal indicates the signal strength.

10. The method according to claim 1, wherein the first electronic device comprises a first microphone and a second microphone, and a distance between the first microphone and the second microphone is greater than a preset distance.

11. The method according to claim 10, wherein:

the determining, based on the first ultrasonic signal sent by the second electronic device, information about the first angle of the second electronic device relative to the first electronic device comprises:

determining, based on the first ultrasonic signal, a first distance difference between a distance between a speaker of the second electronic device that sends the first ultrasonic signal and the first microphone and a distance between the speaker and the second microphone; and determining the information about the first angle based on the first distance difference and the distance between the first microphone and the second microphone; and the determining, based on a second ultrasonic signal sent by the second electronic device, information about a second angle of the second electronic device relative to the first electronic device comprises:

determining, based on the second ultrasonic signal, a second distance difference between the distance between the speaker of the second electronic device that sends the second ultrasonic signal and the first microphone and the distance between the speaker and the second microphone; and determining the information about the second angle based on the second distance difference and the distance between the first microphone and the second microphone.

12. The method according to claim 11, wherein:

the determining, based on the first ultrasonic signal, the first distance difference between the distance between the speaker of the second electronic device that sends the first ultrasonic signal and the first microphone and the distance between the speaker and the second microphone comprises:

determining, based on the first ultrasonic signal and a sound speed, the first distance difference between the distance between the speaker of the second electronic device and the first microphone and the distance between the speaker and the second microphone; and the determining, based on the second ultrasonic signal, the second distance difference between the distance between the speaker of the second electronic device that sends the second ultrasonic signal and the first microphone and the distance between the speaker and the second microphone comprises:

determining, based on the second ultrasonic signal and the sound speed, the second distance difference between the distance between the speaker of the second electronic device and the first microphone and the distance between the speaker and the second microphone;

wherein the sound speed is a fixed value, or the sound speed is determined based on a temperature, wherein the temperature is obtained by the first electronic device through detection, or the temperature is received by the first electronic device from the second electronic device.

13. The method according to claim 1, wherein the first electronic device is a mobile phone, and the second electronic device is a TAG device.

14. A first electronic device, comprising:

a memory storing instructions; and at least one processor in communication with the memory, the at least one processor configured, upon execution of the instructions, to perform the following steps:

determining, based on a first ultrasonic signal sent by a second electronic device, information about a first angle of the second electronic device relative to the first electronic device;

outputting a first prompt signal, the first prompt signal prompting the user to rotate the first electronic device;

determining, based on a second ultrasonic signal sent by the second electronic device, information about a second angle of the second electronic device relative to the first electronic device; and outputting a first directing signal based on the information about the first angle, the information about the second angle, and a rotation angle of the first electronic device, the first directing signal directing the user to search for the second electronic device.

15. A non-transitory computer-readable media storing computer instructions that configure at least one processor of a first electronic device, upon execution of the instructions, to perform the following steps:

determining, based on a first ultrasonic signal sent by a second electronic device, information about a first angle of the second electronic device relative to the first electronic device;

outputting a first prompt signal, the first prompt signal prompting the user to rotate the first electronic device;

determining, based on a second ultrasonic signal sent by the second electronic device, information about a second angle of the second electronic device relative to the first electronic device; and outputting a first directing signal based on the information about the first angle, the information about the second angle, and a rotation angle of the first electronic device, the first directing signal directing the user to search for the second electronic device.

* * * * *